US012197153B2

(12) United States Patent
Nagashima et al.

(10) Patent No.: US 12,197,153 B2
(45) Date of Patent: Jan. 14, 2025

(54) HEATING DEVICE AND IMAGE FORMING APPARATUS

(71) Applicant: CANON KABUSHIKI KAISHA, Tokyo (JP)

(72) Inventors: Satoru Nagashima, Tokyo (JP); Satoshi Ishida, Kanagawa (JP); Hiromitsu Takano, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/504,070

(22) Filed: Nov. 7, 2023

(65) Prior Publication Data

US 2024/0184234 A1 Jun. 6, 2024

(30) Foreign Application Priority Data

Dec. 6, 2022 (JP) ................................ 2022-195210

(51) Int. Cl.
*G03G 15/20* (2006.01)
*G03G 15/00* (2006.01)

(52) U.S. Cl.
CPC ....... *G03G 15/2039* (2013.01); *G03G 15/205* (2013.01); *G03G 15/5004* (2013.01); *G03G 15/80* (2013.01)

(58) Field of Classification Search
CPC ............. G03G 15/2039; G03G 15/205; G03G 15/5004; G03G 15/80
See application file for complete search history.

(56) References Cited

U.S. PATENT DOCUMENTS

| | | | | |
|---|---|---|---|---|
| 11,353,810 | B2 | 6/2022 | Nagashima | G03G 15/2039 |
| 2012/0212980 | A1* | 8/2012 | Kato | B41J 29/38 363/21.12 |
| 2018/0269794 | A1* | 9/2018 | Arimoto | H02M 1/08 |
| 2020/0292981 | A1 | 9/2020 | Nagashima | G03G 15/00 |
| 2021/0364953 | A1 | 11/2021 | Nagashima | G03G 15/00 |
| 2022/0352825 | A1* | 11/2022 | Uchiyama | H02M 3/33569 |
| 2023/0273561 | A1 | 8/2023 | Nagashima et al. | G03G 15/20 |

FOREIGN PATENT DOCUMENTS

| | | |
|---|---|---|
| JP | H04-287079 | 10/1992 |
| JP | H06-282199 | 10/1994 |
| JP | 2013-025055 | 2/2013 |
| JP | 2021-184019 | 12/2021 |

* cited by examiner

*Primary Examiner* — Joseph S Wong
(74) *Attorney, Agent, or Firm* — Venable LLP

(57) ABSTRACT

A heating device includes a heat generating element, a switching element, a capacitor, a connecting portion, and a controller. When the connecting means is changed in state from an on state to an off state, the controller causes the capacitor to discharge an electric charge of the capacitor by bringing the switching element into a conduction state for a predetermined time after the connecting means is changed in state to the off state.

11 Claims, 11 Drawing Sheets

HEATING DEVICE AND IMAGE FORMING APPARATUS

FIELD OF THE INVENTION AND RELATED ART

The present invention relates to a heating device and an image forming apparatus and, for example, relates to a circuit for controlling electric power supplied to an image heat fixing device mounted in the image forming apparatus such as a copying machine or a laser beam printer.

There is a circuit in which electric power is supplied from an AC power source to a load by controlling electric power supply to a bidirectional thyristor (hereinafter, referred to as a triac). In such a circuit, as a technique in which electric power supply is controlled by causing a current to flow through a gate of a triac by a DC voltage generated from an AC voltage of an AC power source, for example, a constitution such as Japanese Laid-Open Patent Application (JP-A) 2021-184019 has been proposed.

As in the conventional technique, in a circuit such that the triac is controlled by causing the gate current to flow from a DC voltage source generated from the AC voltage, an electric charge charged in a capacitor which is a DC power source remains for a long time even after the power source of an apparatus is turned off. There is a liability that when external noise is generated, the electric charge remaining in the capacitor causes unintended electric power supply to a heater and electric discharge damage due to electric discharge to a peripheral component (part) during exchange of a circuit substrate, such as repair.

SUMMARY OF THE INVENTION

The present invention has accomplished in these circumstances. A principal object of the present invention is to provide a heating device and an image forming apparatus which are capable of discharging an electric charge of a capacitor for supplying a current to a control terminal of a switching element with a simple means safely and so as not to have no influence on another operation.

According to an aspect of the present invention, there is provided a heating device for heating an image formed on a recording material, comprising: a heat generating element configured to generate heat by electric power supplied from an AC power source; a switching element configured to supply the electric power from the AC power source to the heat generating element in a conduction state and to cut off supply of the electric power in a non-conduction state; a capacitor configured to supply a current to a control terminal of the switching element; connecting means configured to be connected between the AC power source and the switching element so as to supply the electric power to the switching element in an on state and so as to cut off supply the electric power to the switching element in an off state; and a controller configured to control the connecting means and to control the switching element by controlling supply of the current from the capacitor to the control terminal, wherein when the connecting means is changed in state from the on state to the off state, the controller causes the capacitor to discharge an electric charge of the capacitor by bringing the switching element into the conduction state for a predetermined time after the connecting means is changed in state to the off state.

According to another aspect of the present invention, there is provided an image forming apparatus comprising: an image forming means configured to form an image on a recording material; and the above-described heating device and configured to fix a toner image formed by the image forming means.

According to another aspect of the present invention, there is provided an image forming apparatus comprising: an image forming means configured to form an image on a recording material; the above-described heating device and configured to fix a toner image formed by the image forming means; and a power switch configured to cut off a power source, wherein the controller controls the connecting means so as to be changed in state to the off state depending on that the power switch is turned off.

According to a further aspect of the present invention, there is provided an image forming apparatus operable in a first state in which an image is formed and a second state lower in electric power consumption than in the first state, the image forming apparatus comprising: an image forming means configured to form an image on a recording material; and the above-described heating device and configured to fix a toner image formed by the image forming means, wherein depending on transition from the first state to the second state, the controller controls the connecting means so as to be changed in state to the off state.

Further features of the present invention will become apparent from the following description of exemplary embodiments with reference to the attached drawings.

DESCRIPTION OF THE EMBODIMENTS

In the following, embodiments for carrying out the present invention will be described specifically with reference to the drawings.

Embodiment 1

In the following, an embodiment 1 according to the present invention will be described based on the drawings. However, constitutions and the like described in this embodiment are not intended to limit the scope of the present invention to those unless otherwise specified.

[General Structure of Image Forming Apparatus]

Figure 1:
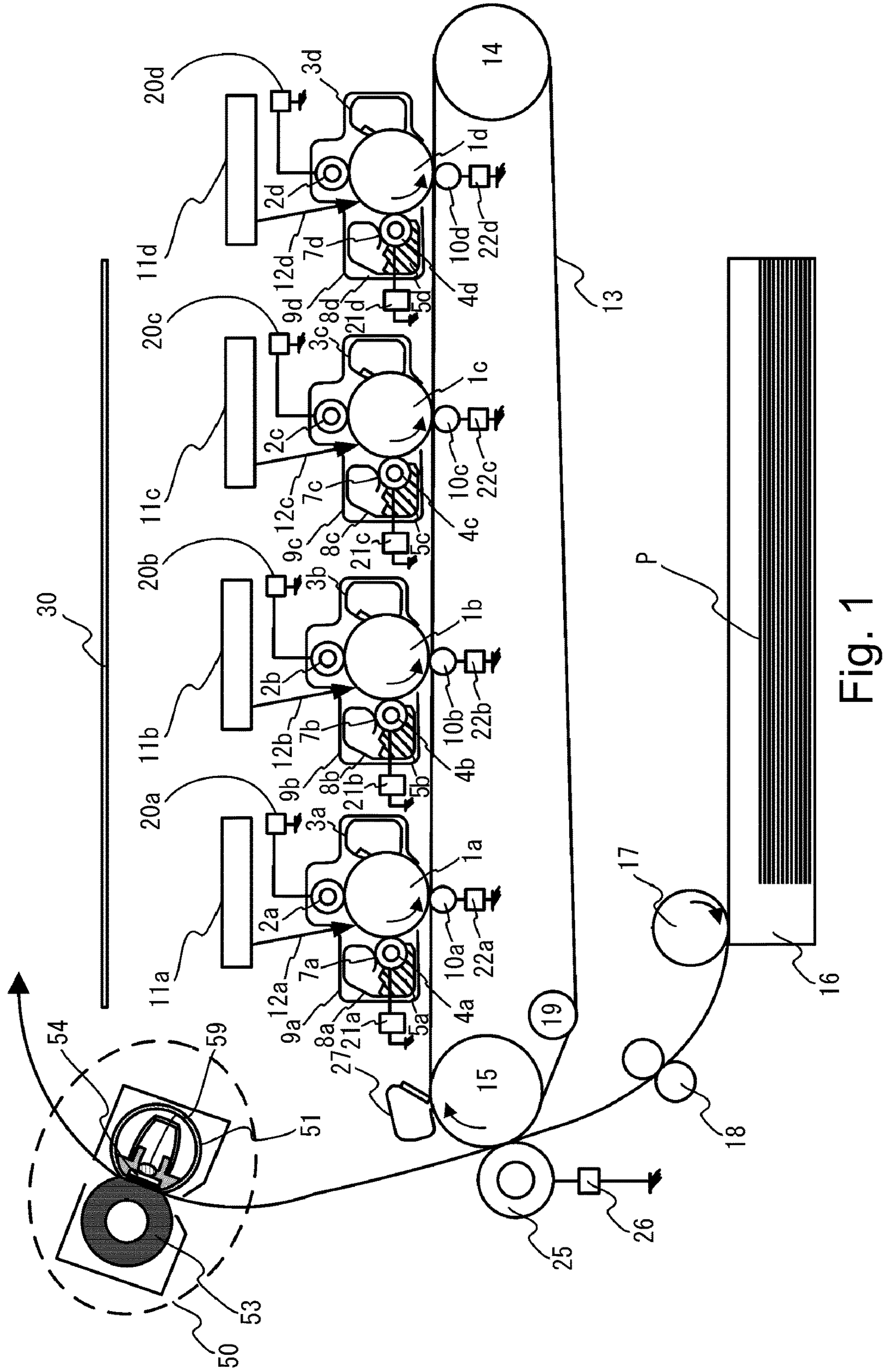
FIG. 1 is a schematic view showing a general structure of an image forming apparatus according to embodiments 1 to 4.

FIG. 1 is a schematic sectional view showing a structure of an in-line color image forming apparatus which is an example of an image forming apparatus in which a fixing device according to the embodiment 1 is mounted. An operation of the color image forming apparatus of an electrophotographic type will be described using FIG. 1. Incidentally, a first station is a station for forming a toner image of yellow (Y), and a second station is a station for forming a toner image of magenta (M). Further, a third station is a station for forming a toner image of cyan (C), and a fourth station is a station for forming a toner image of black (K).

In the first station, a photosensitive drum 1*a* which is an image bearing member is an OPC photosensitive drum. The photosensitive drum 1*a* comprises a plurality of lamination layers of functional organic materials, including a carrier generating layer for generating electric charges on a metal cylinder through light exposure and a charge transporting layer for transporting the generated electric charges, and the like layer, and an outermost layer is low in electrical conductivity and is substantially insulative. A charging roller 2*a* which is a charging means is contacted to the photosensitive drum 1*a* and electrically charges a surface of the photosensitive drum 1*a* uniformly while being rotated by the photosensitive drum 1*a* with rotation of the photosensitive drum 1*a*. To the charging roller 2*a*, a voltage superposed with a DC voltage or an AC voltage is applied, so that electric discharge generates from a nip between the surfaces of the charging roller 2*a* and the photosensitive drum 1*a* in minute air gaps on sides upstream and downstream of the nip with respect to a rotational direction of the photosensitive drum 1*a*, whereby the photosensitive drum 1*a* is charged. A cleaning unit 3*a* is a unit for removing toner remaining on the photosensitive drum 1*a* after primary transfer, as described later. A developing unit 8*a* which is a developing means includes a developing roller 4*a* non-magnetic one-component toner 5*a*, and a developer application blade 7*a*. The photosensitive drum 1*a*, the charging roller 2*a*, the cleaning unit 3*a*, and the developing unit 8*a* constitute an integral process cartridge 9*a* (image forming portion) mountable in and dismountable from the image forming apparatus.

An exposure device 11*a* which is an exposure means is constituted by a scanner means or a light emitting diode (LED) array for scanning the photosensitive drum 1*a* with laser light reflected by a rotary polygonal mirror, and the surface of the photosensitive drum 1*a* is irradiated with a scanning beam 12*a* modulated on the basis of an image signal. Further, the charging roller 2*a* is connected to a charging high-voltage source 20*a* which is a voltage supplying means to the charging roller 2*a*. The developing roller 4*a* is connected to a developing high-voltage source 21*a* which is a voltage supplying means to the developing roller 4*a*. A primary transfer roller 10*a* is connected to a primary transfer high-voltage source 22*a* which is a voltage supplying means to the primary transfer roller 10*a*. The above is a constitution of the first station, and the second to fourth stations have similar constitutions. As regards the second to fourth (other) stations, component elements having the same functions as those in the first station are represented by the same reference numerals, and associated suffixes b, c and d are added to the reference numerals for the respective stations. Incidentally, in the following description, the suffixes a, b, c and d will be omitted except for the case where specific station is described.

An intermediary transfer belt 13 is supported by three rollers, as stretching members therefor, consisting of a secondary transfer opposite roller 15, a tension roller 14, and an auxiliary roller 19. To only the tension roller 14, a force in a direction in which the intermediary transfer belt 13 is stretched is applied by a spring (not shown), so that proper tension applied to the intermediary transfer belt 13 is maintained. The secondary transfer opposite roller 15 is rotated by receiving rotational drive from a main motor (not shown), so that the intermediary transfer belt 13 surrounding the secondary transfer opposite roller 15 is rotated. The intermediary transfer belt 13 is moved in a forward direction (for example, the clockwise direction in FIG. 1) for the photosensitive drums 1*a* to 1*d* (for example, rotate in the counterclockwise direction in FIG. 1) substantially at the same speed. Further, the intermediary transfer belt 13 is rotated in an arrow direction (clockwise direction, and the primary transfer roller 10 is disposed on a side opposite to the photosensitive drum 1 while sandwiching the intermediary transfer belt 13 therebetween, and is rotated with rotation of the intermediary transfer belt 13. A position where the photosensitive drum 1 contacts the intermediary transfer belt 13 toward the primary transfer roller 10 is a primary transfer position. The auxiliary roller 19, the tension roller 14 and the secondary transfer opposite roller 15 are electrically grounded. Incidentally, primary transfer rollers 10*b* to 10*d* of the second to fourth stations also have constitutions similar to the constitution of the primary transfer roller 10*a* of the first station, and therefore, will be omitted from description.

Next, an image forming operation of the image forming apparatus of the embodiment 1 will be described. When the image forming apparatus receives a print instruction in a stand-by state, the image forming apparatus starts the image forming operation. The photosensitive drum 1 and the intermediary transfer belt 13, and the like start rotations in the arrow directions in FIG. 1 at a predetermined process speed by the main motor (not shown). The photosensitive drum 1*a* is electrically charged uniformly by the charging roller 2*a* to which a charging voltage is applied from the charging high-voltage source 20*a*, and then is exposed to the scanning beam 12*a* emitted from the exposure device 11*a*, so that an electrostatic latent image is accordance with image information is formed on the photosensitive drum 1*a*. Toner 5*a* in the developing unit 8*a* is negatively charged by the developer applying blade 7*a* and is applied onto the developing roller 4*a*. Then, to the developing roller 4*a*, a predetermined developing voltage is applied from the developing high-voltage source 21*a*. The photosensitive drum 1*a* is rotated, and when the electrostatic latent image formed on the photosensitive drum 1*a* reaches the developing roller 4*a*, the electrostatic latent image is visualized by deposition of the negatively charged toner on the photosensitive drum 1*a*, so that a toner image of a first color (for example, Y (yellow)) is formed in the photosensitive drum 1*a*. The stations (process cartridges 9*b* to 9*d*) for other colors of M (magenta), C (cyan) and K (black) similarly operate. At certain timings, depending on distances between the respective primary transfer positions for the colors, the electrostatic latent images by exposure are formed on the photosensitive drums 1*a* to 1*d* while delaying writing signals from a controller (not shown). To each of the primary transfer rollers 10*a* to 10*d*, high DC voltages of a polarity opposite to a charge polarity of the toner are applied. By the above-described steps, the toner images are successively transferred onto the intermediary transfer belt 13 (hereinafter, this transfer is referred to as primary transfer), so that multiple-toner images are formed on the intermediary transfer belt 13.

Thereafter, in synchronism with the toner image formation, a sheet P which is a recording material stacked on a cassette 16 is fed (picked up) by a sheet (paper) feeding roller 17 rotationally driven by a sheet (paper) feeding solenoid (not shown). The fed sheet P is fed to a registration roller pair 18 by feeding (conveying) rollers. The sheet P is fed to a transfer nip, which is a contact portion between the intermediary transfer belt 13 and a secondary transfer roller 25, by the registration roller pair 18 in synchronism with the toner images on the intermediary transfer belt 13. To the secondary transfer roller 25, a voltage of a polarity opposite to the charge polarity of the toner is applied by a secondary transfer high-voltage source 26, so that the multiple toner images of the four colors carried on the intermediary transfer belt 13 are collectively transferred onto the sheet (recording material) P (hereinafter, this transfer is formed to as secondary transfer). Members contributing to the image forming operation until the unfixed toner images are formed on the sheet P (for example, the photosensitive drum 1 and the like) function as an image forming means. On the other hand, after the secondary transfer is ended, the toner remaining on the intermediary transfer belt 13 is removed by a cleaning unit 27. A fixing device 50 is a heating device for fixing the toner image, after the secondary transfer thereof is ended, on the sheet P, and includes a film 51, a heater 54 which is a heat generating element, a fixing temperature sensor 59 which is a temperature detecting means for detecting a temperature of the heater 54, and a pressing roller 53 which is a roller as a rotatable pressing member. The heater 54 generates heat by being supplied with electric power from an AC power source. The pressing roller 53 is rotatably held at opposite ends and is rotationally driven by a fixing motor (not shown). Further, by rotation of the pressing roller 53, the film 51 is rotated. The heater 54 as a heating member is temperature-controlled to a desired temperature by a CPU (not shown) on the basis of a detection result of the fixing temperature sensor 59 for detecting the temperature of the heater 54. By the heater 54 controlled to the desired temperature, heat is conducted to the film 51. Thus, the sheet P after the secondary transfer is ended is fed to the fixing device 50 which is a fixing unit, in which the toner image is fixed on the sheet P by heat of the film 51 and pressure of the pressing roller 53, and then the sheet P is discharged as an image-formed product (print, copy) onto a discharge tray 30.

[Block Diagram of Image Forming Apparatus]

Figure 2:
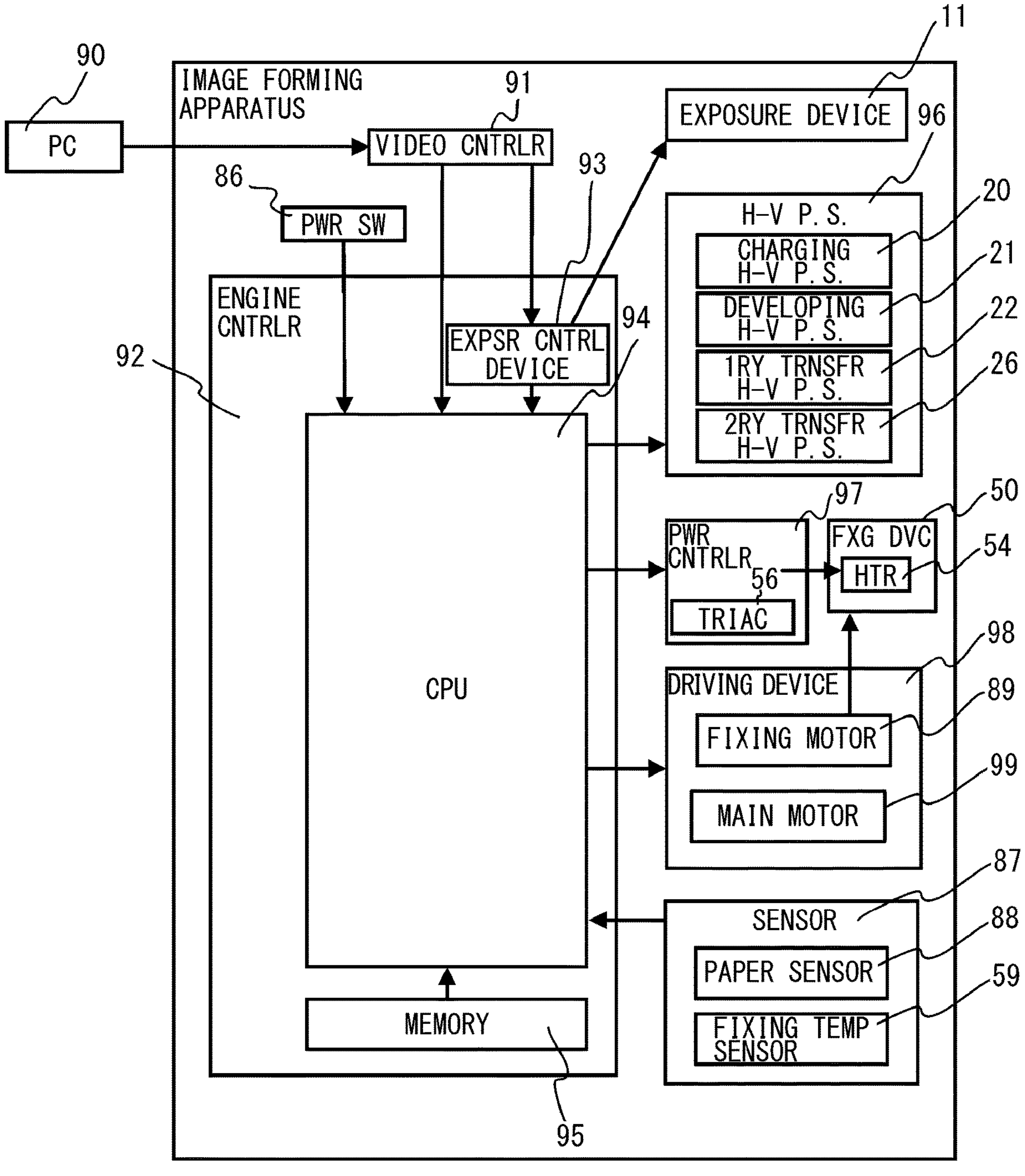
FIG. 2 is a control block diagram of the image forming apparatus of the embodiments 1 to 4.

FIG. 2 is a block diagram for illustrating an operation of the image forming apparatus, and a printing operation of the image forming apparatus will be described while making reference to FIG. 2. A PC 90 which is a host computer outputs a printing instruction to a video controller 91 provided inside the image forming apparatus, and has a function of transferring image data of a print image to the video controller 91. The video controller 91 converts the image data, from the PC 90, into the exposure data, and transfers the exposure data to an exposure control device 93 provided in an engine controller 92. The exposure control device 93 is controlled from the CPU 94, and controls the exposure device 11 for turning on and off the laser light depending on the exposure data. The CPU 94 which is a control means starts an image forming sequence when receives the printing instruction.

In the engine controller 92, the CPU 94, a memory 95 and the like are mounted, and the engine controller 92 performs an operation programmed advance. A high-voltage source 96 includes the charging high-voltage source 20, the developing high-voltage source 21, the primary transfer high-voltage source 22, and the secondary transfer high-voltage source 26 which are described above. Further, an electric power controller 97 includes a bidirectional thyristor (hereinafter, referred to as a triac) 56. The triac 56 is a switching element which supplies electric power from the AC power source to the heater 54 in a conduction state and which cuts off the supply of the electric power in a non-conduction state. The triac 56 includes a gate terminal which is a control terminal, a T1 terminal, and a T2 terminal, and in the following, the term "terminal" will be omitted in some cases. The electric power controller 97 controls an amount of electric power supplied to the heater 54 in the fixing device 50.

A driving device 98 includes the main motor 99, the fixing motor 89 and the like. A driving force is transmitted to the pressing roller 53 of the fixing device 50 by the fixing motor 89, so that the pressing roller 53 is rotationally driven. A sensor 87 is constituted by the fixing temperature sensor 59 which is a temperature detecting sensor for detecting the temperature of the fixing device 50, a sheet (paper presence/absence) sensor 88, provided with a flag, for detecting presence or absence of the sheet P, and the like sensor, and a detection result of the sensor 87 is sent to the CPU 94. The CPU 94 acquires the detection result of the sensor 87 in the image forming apparatus, and controls the exposure device 11, the high-voltage source 96, the electric power controller 97, and the driving device 98 on the basis of the detection result. By this, the CPU 94 carries out formation of the electrostatic latent image, transfer of the toner image into which the electrostatic latent image is developed, fixing of the toner image on the sheet P, and the like, and thus carries out control of an image forming step in which exposure data is printed as the toner image on the sheet P. A power switch 86 is a switch which is ON/OFF-operated by a user, and on the basis of operation information of the power switch 86, for each of an ON state and an OFF state, the CPU 94 causes the above-described various blocks to operate in a predetermined state in advance.

[Constitution and Operation of Electric Power Control Portion]

Figure 3:
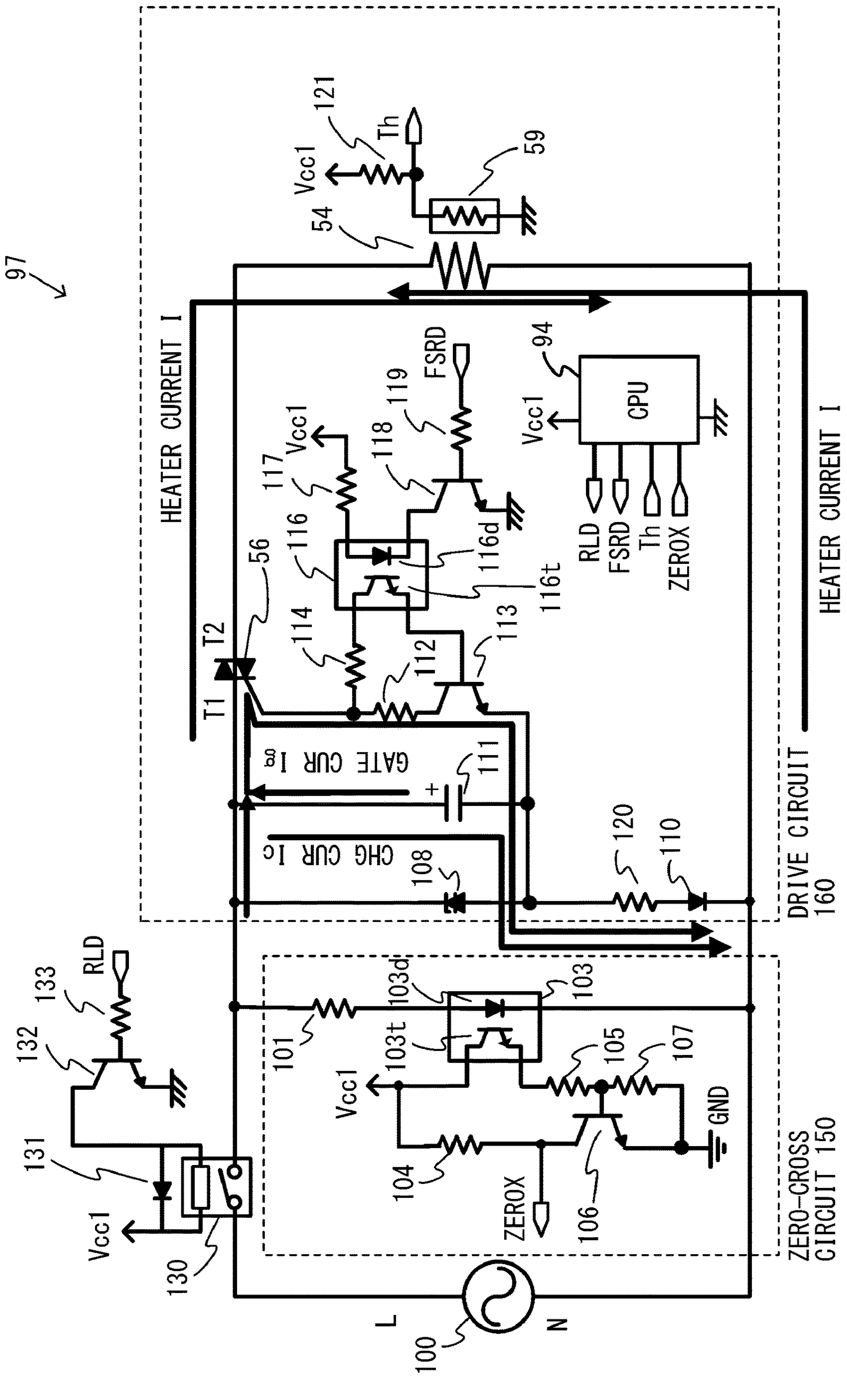
FIG. 3 is a schematic view showing entirety of a circuit constitution of a fixing device of the embodiments 1 to 4.

FIG. 3 is a schematic view showing entirety of the electric power controller 97 in the embodiment 1. The electric power controller 97 includes a zero-cross circuit portion 150 and a drive circuit portion 160. First, an operation of a relay 130 will be described. The relay 130 is connected between the AC power source 100 and the triac 56, and functions as a connecting means which supplies the electric power to the triac 56 in an ON state and which cuts off the supply of the electric power to the triac 56 in an OFF state. When a DC voltage Vcc1 is supplied and an RLD signal is outputted in a high-level state, a current flow through a base and between a collector and an emitter of a transistor 132 via a resistor 133 and flows through a coil portion of the relay 130. When the current flows through the coil portion, a contact is short-circuited by an electromagnetic force, so that opposite ends of the relay 130 on a primary side are electrically conducted to each other. In the following, this state is referred to as an ON state.

When the output of the RLS signal is stopped from the CPU 94 and becomes a low-level state, the relay 130 becomes the OFF state again. When the relay 130 becomes the OFF state, counter-electromotive force generates at the opposite ends of the relay 130. This counter-electromotive force is consumed as Joule heat of a coil resistance of the relay 130 by flow of the current via a protective diode 131.

(Zero-Cross Circuit)

The zero-cross circuit portion 150 which is a zero-cross detecting means will be described. The zero-cross circuit portion 150 is connected to the AC power source 100 via the relay 130, and outputs a high-level state or a low-level state (ZEROX signal described later) depending on a cycle (cyclic period) of an AC voltage of the AC power source 100. For example, the zero-cross circuit portion 150 outputs the high-level state or the low-level state depending on a timing of transition of a state in which an L-pole side of the AC power source 100 is higher in voltage than an N-pole side of the AC power source 100 to a state in which the N pole side is higher in voltage than the L-pole side or depending on a timing opposite thereto. The timing of the transition of the state in which the L-pole side of the AC power source 100 is higher than the N-pole signal to the state in which the N-pole side of the AC power source 100 is higher than the L-pole signal or the timing opposite thereto is referred to as an electric charge point.

A photodiode 103*d* of the photocoupler 103 is changed to one pole (L pole) of the AC power source 100 via the resistor 101. When a voltage on the L-pole side of the AC power source 100 is changed to a voltage higher than a voltage than a voltage on the N-pole side becomes a voltage of a certain value or more, a current flows through the photodiode 103*d* of the photocoupler 103 via the resistor 101, so that the photodiode 103*d* emits light. When the photodiode 103*d* of the photocoupler 103 emits light, a current flows along the following path. That is, the current flows from the DC voltage Vcc1 connected via the resistor through between a collector and an emitter of a light receiving side-transistor 103*t* of the photocoupler 103, a resistor 105, a resistor 107 and thus flows toward the ground (hereinafter referred to as GND) through the light receiving side-transistor 103*t* of the photocoupler 103. Further, at this time, a current flowing through the light receiving side-transistor 103*t* of the photocoupler 103 also flows toward a base of a transistor 106 via the resistor 105. When the current flows through the base of the transistor 106, the current flows from the DC voltage source Vcc1 toward a resistor 104 and between a collector and an emitter of the transistor 106, and a potential between the resistor 104 and a collector of the transistor 106 is inputted as the ZEROX signal to the CPU 94.

At this time, the ZEROX signal changes from a high level (Vcc1 potential) to a low level.

When a potential of the L-pole of the AC power source 100 lowers to a certain value or less, the photocoupler 103 turns off, so that the base current of the transistor 106 does not flow, and therefore, the ZEROX signal changes from the low level to the high level (Vcc1 potential). In the case where a voltage on the N-pole side of the AC power source 100 is changed to a voltage higher than a voltage on the L-pole side, the photodiode 103*d* of the photocoupler 103 does not emit light, and therefore, the state changes to a state in which the base current of the transistor 106 does not flow, so that the state of the ZEROX signal changes to a high-level state. Thereafter, similarly, the zero-cross circuit portion 150 outputs the ZEROX signal to the CPU 94 in synchronism with the operation of the AC power source 100.

(Drive Circuit Portion)

Next, the drive circuit portion 160 will be described. On the basis of the ZEROX signal detected by the above-described zero-cross circuit portion 150, the CPU 94 changes the FSRD signal from a low-level state to a high-level state. When the FSRD signal changes in level from a low level to a high level, the current flows to between a base and an emitter of a transistor 118 via a resistor 119. When the current flows between the base and the emitter of the transistor 118, from the DC voltage (source) Vcc1 connected via the resistor 117, the current flows through the photodiode 116*d* of the photocoupler 116 and through between a collector and the emitter of the transistor 118. By this, the photodiode 116*d* of the photocoupler 116 emits light.

When the photodiode 116*d* of the photocoupler 116 emits light, a current flows between a collector and an emitter of a light receiving side-transistor 116*t* of the photocoupler 116 via a resistor 114, so that the transistor 113 is turned on, and in the case where a voltage of the AC power source 100 on the L-pole side (changes to a voltage higher than a voltage on the N-pole side, a gate current of the triac 56 principally flows along two current paths. A first current path is a path such that an electric charge is supplied and a current flows through the capacitor 111, between T1 and the gate of the triac, a resistor 112, and between a collector and an emitter of the transistor 113. A second current path is a path along which the current flows from the L-pole of the AC power source 100 through between the T1 and the gate of the triac 56, the resistor 112, and the collector and the emitter of the transistor 113 and flows toward, a resistor 120 and a diode 110. In the case where the voltage of the AC power source 100 on the N-pole side changes to a voltage higher than the voltage on the L-pole side, as regards the gate current of the triac 56, electric charges are supplied only from the capacitor 111, and the current flows along the similar paths.

That is, when the photodiode 116*d* the photocoupler 116 emits light, in the case where the voltage of the AC power source 100 on the L-pole side changes to a voltage higher than the voltage on the N-pole side, the gate current of the triac 56 is supplied from two portions consisting of the capacitor 111 and the AC power source 100. In the case where the voltage of the AC power source 100 on the N-pole side changes to a voltage higher than the voltage on the L-pole side, the gate current of the triac 56 is supplied from only the capacitor 111. When the current flows to between the T1 and the gate of the triac 56, the state between the T1 and T2 of the triac 56 becomes a conduction state (hereinafter referred to as an ON state), so that the current flows between the T1 and the T2 and thus the electric power is supplied to the heater 54. The conduction state between the T1 and T2 of the triac 56 is referred to as an ON state.

When the FSRD signal changes in level from a high level to a low level, the photocoupler 116 turns off, so that the gate current of the triac 56 does not flow. For this reason, the state between the T1 (terminal) and the T2 (terminal) of the triac 56 becomes a non-conduction state, so that the current does not flow between the T1 and the T2 and thus the electric power is not supplied to the heater 54. The non-conduction state between the T1 and the T2 of the triac 56 is referred to as an OFF state. The CPU 94 switches between the high level and the low level of the FSRD signal and thus controls turning on/off of the gate current, so that the CPU 94 controls supply of the electric power to the heater 54. Thus, depending on the FSRD signal outputted from the CPU 94, the triac 56 repeats turning-on and turning-off thereof every half-wave of the AC power source 100 and thus controls the electric power supply to the heater 54.

(Charging Circuit of Capacitor)

Finally, charging circuit of the capacitor 111 will be described. The capacitor 111 is a capacitor for supplying a current to the gate of the triac 56. In the case where the voltage of the AC power source 100 on the L-pole side changes to a voltage higher than the voltage on the N-pole side, The electric charges are charged in the capacitor 111 by a current flowing from the L-pole side along a path via the capacitor 111, the resistor 120 and the diode 110. An upper-limit voltage applied to both terminals of the capacitor 111 is restricted by Zener voltage of Zener diode 108. In the case where the voltage of the AC power source 100 on the N-pole side is a voltage higher than the voltage on the L-pole side, the direction of the current is restricted depending on the polarity of the diode 110, so that the charging current of capacitor 111 does not flow.

[Charging and Discharging Operation to Capacitor 111]

A charging operation to the capacitor 111 will be described. When the voltage of the AC power source 100 on the L-pole side changes to a voltage higher than the voltage on the N-pole side, electric charges are charged in the capacitor 111 by an operation of the above-described charging circuit. In the case where the voltage of the AC power source 100 on the N-pole side changes to a voltage higher than the voltage on the L-pole side, the electric charges are not charged in the capacitor 111.

Next, the discharging operation will be described. Even in the case where voltage of the AC power source 100 on the L-pole side changes to the voltage higher than the voltage on the N-pole side, the current flows along the following path depending on an operation in which the CPU 94 changes the FSRD signal in level to the high level. That is, the current flows along a path through the capacitor 111, between the T1 and the gate of the triac 56, the resistor 112, and between the collector and the emitter of the transistor 113. Thus, when the current flows, the capacitor 111 discharges.

That is, in the case where the triac 56 is turned on when the voltage of the AC power source 100 on the L-pole side of the AC power source 100, the capacitor 111 discharges the electric charge for causing the gate current Ig of the triac 56 to flow while charging the electric charge from the AC power source 100. In the case where the triac 56 is turned on when the electric power is supplied from the N-pole side of the AC power source 100, in order to cause the gate current Ig of the triac 56 to flow, the capacitor 111 does not charge but only discharges. The CPU 94 controls the triac 56 by not only controlling the relay 130 but also controlling supply of the current from the capacitor 111 to the gate of the triac 56.

[Operations of Fixing Temperature Sensor 59 and CPU 94]

The operations of the fixing temperature sensor 59 and the CPU 94 will be described. The fixing temperature sensor 59 is an NTC thermistor and has a characteristic such that a resistance value is high at a low temperature and is low at a high temperature. Incidentally, as the fixing temperature sensor 59, an element having an opposite characteristic may also be used. The fixing temperature sensor 59 contacts the heater 54 and changes in resistance characteristic by the temperature of the surface of the heater 54. The fixing temperature sensor 59 is connected to the DC voltage Vcc1 via the resistor 121 at one end thereof and is connected to the GND at the other end thereof. To the CPU 94, a Th signal which is a signal obtained by dividing the DC voltage Vcc1 by the resistor 121 and the fixing temperature sensor 59 is connected. The Th signal is, as described above, a signal of which voltage value changes depending on a change in resistor value of the fixing temperature sensor 59 depending on the temperature of the heater 54. On the basis of the Th signal changed depending on the temperature of the heater 54, a target temperature value determined in advance, and a timing when the above-described zero-cross signal is detected, the CPU 94 currents the FSRD signal. By this, the CPU 94 performs supply and interruption of the supply of electric power with a half-wave from the AC power source 100 to the heater 54, and thus carries out control so that a temperature of the fixing temperature sensor 59 becomes a desired temperature.

Incidentally, the half-wave corresponds to a waveform of a half of one cycle in the case where the AC voltage is an ideal sine wave. Further, as shown in FIG. 3, the current flowing through the heater 54 is referred to as a heater current I. The current flowing through between the T1 and the gate from the capacitor 111 to the triac 56 is referred to as a gate current Ig. The current flowing when the capacitor 111 is charged is referred to as a charging current Ic.

[Timing Chart after Power Source Switch Off in Embodiment 1]

Figure 4:
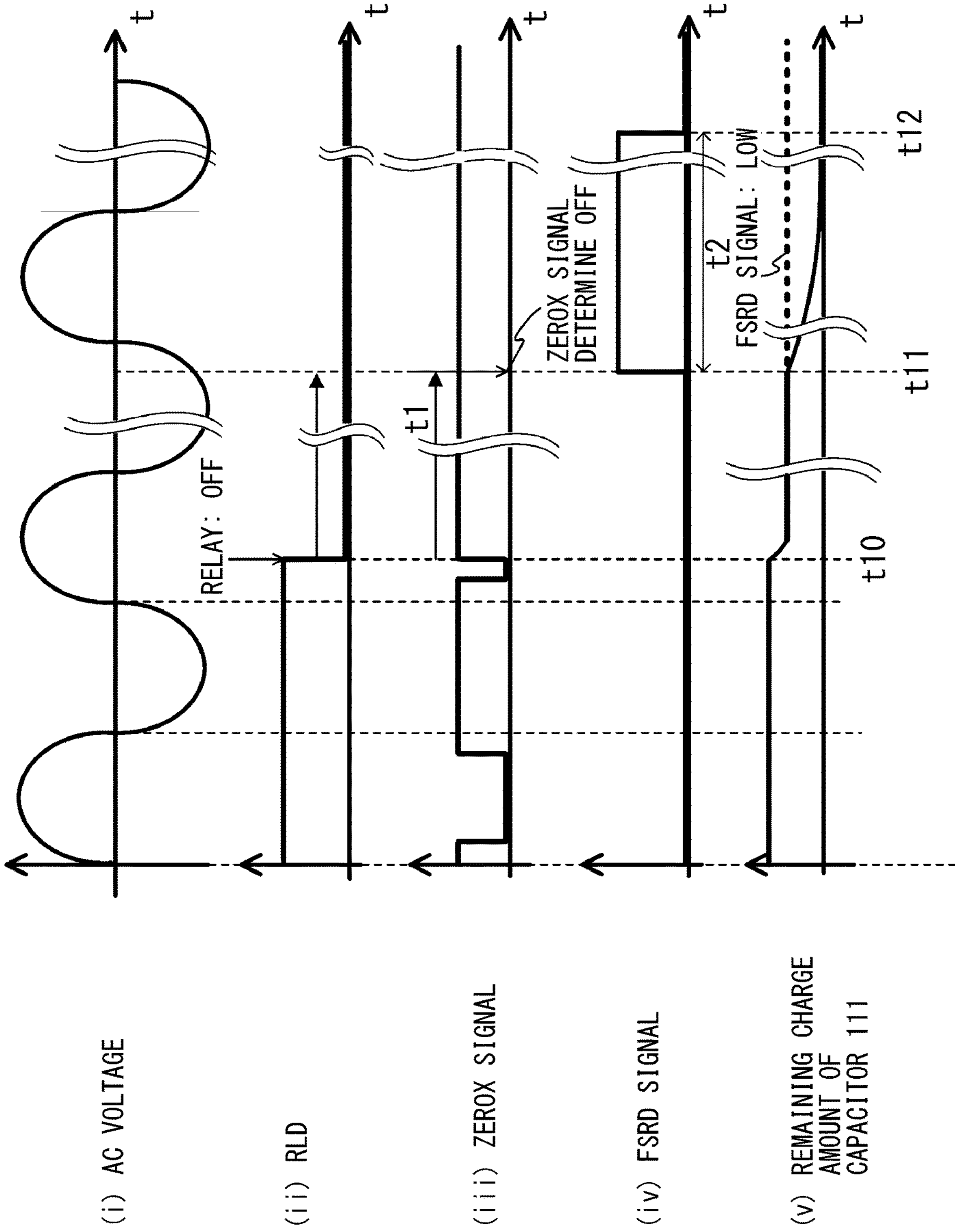
FIG. 4 is a timing chart showing an operation after turning-off of a power switch in the embodiments 1.

Parts (i) to (v) of FIG. 4 are timing charts in the embodiment 1. In FIG. 4, part (i) shows a waveform of the AC voltage of the AC power source 100, part (ii) shows a waveform (low level, high level) of a RLD signal outputted from the CPU 94, part (iii) shows a waveform (low level, high level) of the ZEROX signal, part (iv) shows a waveform (low level, high level) of the FSRD signal outputted from the CPU 94, and part (v) shows a remaining amount of the electric charges in the capacitor 111. In each of parts (i) to (v) of FIG. 4, the abscissa represents a time t. In the embodiment 1, the operation when the image forming apparatus is in the OFF state after the printing operation by pressing of the power switch 86 by the user.

First, operations of the RLS signal and the ZEROX signal will be described. When the power switch is pressed by the user and thus the image forming apparatus is in the OFF state, the CPU 94 causes the RLD signal to change in level from the high level (ON state of the relay 130) to the low level (OFF state of the relay 130).

That is, depending on the turning-off of the power switch 86, the CPU 94 causes the relay 130 to be in the OFF state. In FIG. 4, at a timing t10, the relay 130 becomes the OFF state. When the RLD signal changes in level to the low level, the relay 130 becomes an open state. The level of the ZEROX signal repeats the high level and the low level depending on the AC voltage until the power switch 86 is pressed and thus the relay 130 becomes the OFF state. In the following, a state in which the level of the ZEROX signal repeats the high level and the low level is referred to as a ZEROX signal-ON state. When the power switch 86 is pressed and thus the relay 130 becomes the OFF state, the electric power is not supplied to the zero-cross circuit portion 150, so that the ZEROX signal is still in the OFF state. In the following, a state in which the state of the ZEROX signal is fixed to the high-level state is referred to as a ZEROX signal-OFF state.

As regards the relay 130, after the relay 130 becomes the OFF state, a contact portion thereof causes a bounce operation, so that a time is required until the contact portion is stabilized. The time required to stabilize the contact portion of the relay 130 is referred to as a contact portion stabilization waiting time. Further, as regards the ZEROX signal, there is a liability that temporary external noise is superposed on the ZEROX signal. In order to skip (neglect) the external noise, the ZEROX signal is detected correspondingly to a plurality of unit cycles of the AC power source 100, and then the CPU 94 makes logic determination of a signal level. That is, after the state of the ZEROX signal becomes the high-level state, the CPU 94 continuously monitors the ZEROX signal only for a time which is a sum of a predetermined stabilization waiting time of the above-described relay 130 and a time corresponding to a plurality of cycles of the AC power source 100 determined in advance in order to skip the external noise. The CPU 94 determines a logic (high level or low level) of the ZEROX signal after a lapse of the time of the sum of the above-described times. After the state of the ZEROX signal became the high-level state, a time necessary to make the logic determination by the CPU 94 is a time t1(s) which is a second time in the embodiment 1. The time t1(s) is based on a timing t10 when the relay 130 is turned off. In the embodiment 1, for example, the triac t1(s) is 250 ms. The CPU 94 determines that the state of the ZEROX signal is in the OFF state at a timing t11 after a lapse of the time t1(s) from the timing t10 when the level of the RLD signal becomes the low level (ZEROX signal OFF determination).

Next, an operation of the FSRD signal will be described. In a state in which the printing operation and the electric power supply to the heater 54 are not performed, the CPU 94 keeps the FSRD signal in the low-level state. The CPU 94 determines the ZEROX signal OFF state at the timing t11 after the lapse of the time t1(s) from the timing t10. Then, the CPU 94 changes, at the timing t11, the state of the FSRD signal to the high-level state for a time t2(s), and turns on the triac 56 by causing the gate current Ig to flow through the triac 56 by the above-described operation, so that the triac 56 is turned on. Thus, the CPU 94 brings the triac 56 into the conduction state in the case where the level of the ZEROX signal is kept for the second time after the relay 130 is put in the OFF state.

At a timing t12 after a lapse of the time t2(s) from the timing t11, the CPU 94 returns the level of the FSRD signal to the low level again. The time t2(s) is a predetermined time, and is, for example, 100 ms in the embodiment 1. Even when the FSRD signal is outputted in the high-level state, a contact is open in a state in which the relay 130 is turned off, and therefore, the electric power of the AC power source 100 is not supplied to the heater 54.

Finally, a fluctuation in electric charge amount of the capacitor 111 will be described. In an initial state of FIG. 4, the capacitor 111 is in a charged state to a certain degree, and as described above, the capacitor 111 is continuously charged by a half wave of the AC power source 100 on one (polarity) side. When the image forming apparatus is put in the OFF state by pressing the power switch 86 and the relay 130 is in the OFF state at the timing t10, the charging current Ic is not supplied from the AC power source 100. When the relay 130 is in the OFF state and the charging current Ic is not supplied from the AC power source 100, the electric charge charged in the capacitor 111 flows as a current through the resistor 120 and the zero-cross circuit portion 150, and a part of the electric charge is consumed. A remaining electric charge is continuously maintained in the capacitor 111. Here, the CPU 94 determines the OFF state of the ZEROX signal at the timing t11 as described above, and thereafter, outputs the FSRD signal for the time t2(s). Then, the gate current Ig of the triac 56 flows, so that the electric charge remaining in the capacitor 111 is largely consumed by the resistors 112 and 114, and thus the electric discharge is completed and the voltage converges at almost 0 V. Thus, when the CPU 94 changes in state of the relay 130 from the ON state to the OFF state, after the state of the relay 130 is changed to the OFF state, the CPU 94 brings the triac 56 into the conduction state and thus discharges the electric charge of the capacitor 111 for the time t2(s) (first time) which is a predetermined time.

In the embodiment 1, the resistor 120 is 5.4 kΩ, the resistor 101 is 94 kΩ, and the AC power source 100 is a power source for outputting a sinusoidal voltage with 100 Vrms and a frequency of 50 Hz. Further, the resistor 112 of the gate portion of the triac 56 is 182Ω, and the resistor 114 is 10 kΩ. When the FSRD signal changes in state to the high-level state at the timing t11 and the electric charge of the capacitor 111 flows to the gate portion of the triac 56, the relay 130 is in the OFF state and an open state.

For this reason, the electric power is not supplied to the heater 54, so that the capacitor 111 can be safely discharged without causing component (part) breakage or the like due to temperature rise, overheating, or the like.

In the operation of the capacitor 111 in FIG. 4, a broken line portion (residual electric charge in the case where the state of the FSRD signal is in the low-level state) shows a conventional operation in which the CPU 94 does not output the FSRD signal while keeping the level of the FSRD signal at the low level. In the case where the CPU 94 does not output the FSRD signal while keeping the level of the FSRD signal at the low level, the electric charge of the capacitor 111 is maintained for a long time in an electric charge amount in the time t11.

Thus, when the power switch 86 is pressed, the CPU 94 outputs the FSRD signal in the state in which the relay 130 is in the OFF state, and the current is caused to flow through the gate portion of the triac 56, so that the electric charge of the capacitor 111 is consumed. By this, it is possible to discharge the residual electric charge of the capacitor 111 safely in a short time, and therefore, during exchange of a circuit substrate in repair or the like, electric discharge to a peripheral part can be prevented.

[Electric Discharge Control in Embodiment 1]

Figure 5:
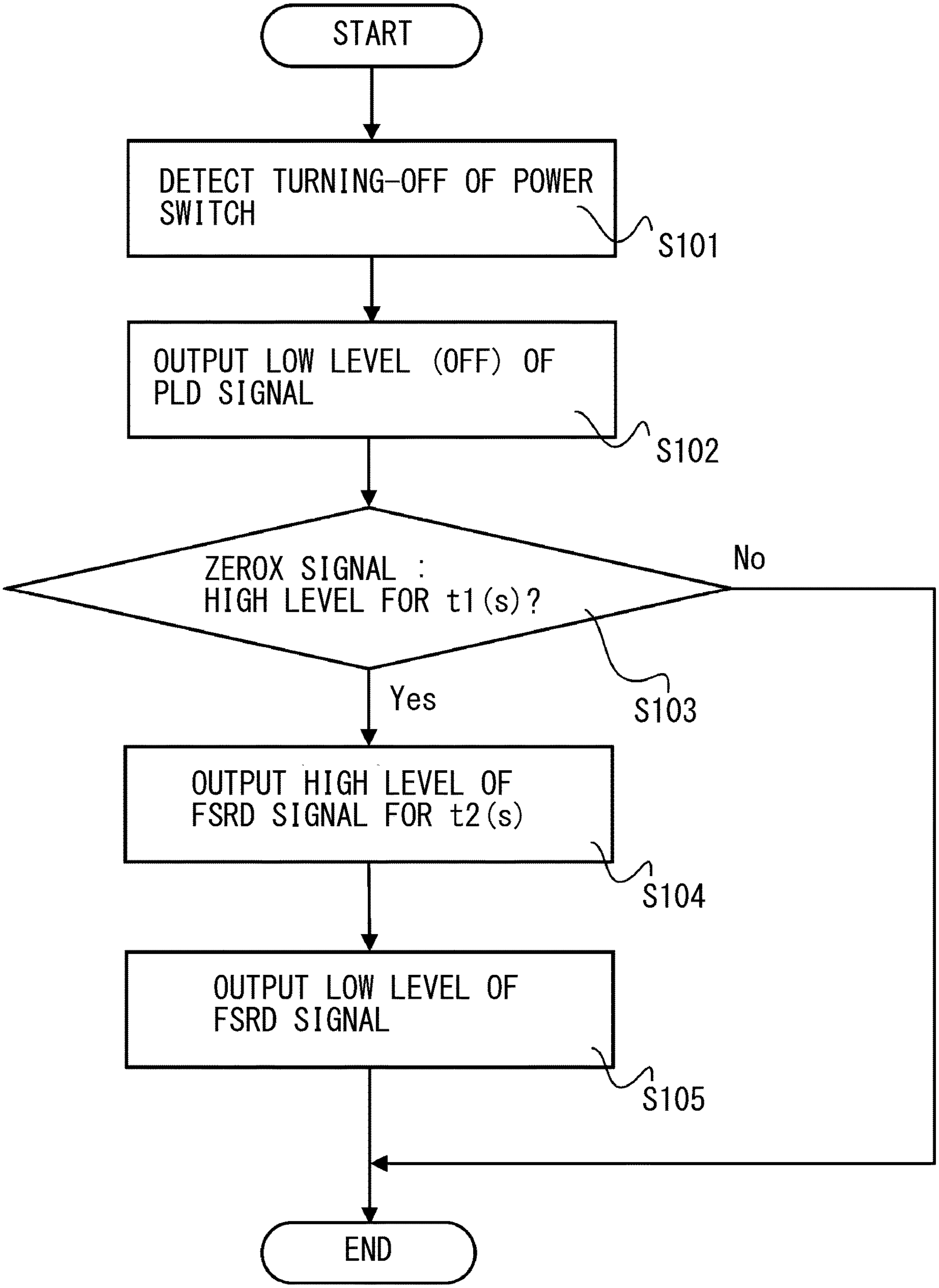
FIG. 5 is a flow chart showing electric discharge control of a capacitor in the embodiment 1.

FIG. 5 is a flow chart showing electric discharge control of the capacitor 111 in the embodiment 1. In a step (hereinafter, referred to as "S") 101, the power switch 86 is pressed, so that the CPU 94 detects that the image forming apparatus becomes the OFF state. When the power switch 86 is pressed and the CPU 94 detects that the image forming apparatus becomes the OFF state, in S102, the CPU 94 changes the RDL signal in level from the high level to the low level and thus brings the relay 130 into the OFF state. After the relay 130 is brought into the OFF state, in S103, the CPU 94 makes reference to a timer (not shown) and discriminates whether or not the ZEROX signal is still at the high level for the time t1(s).

In the case where the CPU 94 discriminated in S103 that the level of the ZEROX signal is switched to the low level before the time t1(s) has elapsed, i.e., in the case where the high-level state is not maintained, the CPU 94 ends the control without performing the electric discharge operation of the capacitor 111. In S103, in the case where the CPU 94 discriminated that the level of the ZEROX signal was kept at the high level for the time t1(s), the CPU 94 causes the processing to go to S104.

In S104, the CPU 94 outputs the FSRD signal in the high-level state for the time t2(s). Incidentally, the CPU 94 makes reference to the timer (not shown) and discriminates a lapse of the time t2(s) on the basis of a timing when the high level of the zero-cross signal is determined (Yes of S103). After the FSRD signal is outputted in the high-level state for the time t2(s), in S105, the CPU 94 brings the FSRD signal into the low-level state again, and thus ends the control.

As described above, in the embodiment 1, when the power switch 86 is pressed by the user and the image forming apparatus becomes the OFF state, the relay 130 is put in the OFF state and the open state. The relay 130 is put in the open state and the electric power supply to the fixing device 50 is but off, and then, the FSRD signal is brought into the ON state, so that the current is caused to flow from the capacitor 111 to the gate portion of the triac 56 and thus the residual electric charge of the capacitor 111 is discharged and consumed. By doing so, in a short time and safely, the residual electric charge of the capacitor 111 can be discharged without having the influence on another operation, and therefore, during exchange of the circuit substrate in repair or the like, it is possible to prevent the electric discharge to the peripheral part.

Incidentally, in the embodiment 1, in the case where the ZEROX signal outputted from the zero-cross circuit portion 150 was kept for the time t1(s) at the high level, discrimination that the relay 130 was turned off was made, but the present invention is not limited thereto. For example, the electric power controller 97 may include a frequency detecting circuit portion which is a frequency detecting means or detecting a frequency of the AC voltage. On the basis of the frequency of the AC voltage detected by the frequency detecting circuit portion, the CPU 94 may discriminate that the relay 130 is turned off. In the following description, instead of the zero-cross circuit portion 150, the frequency detecting circuit portion may also be used.

As described above, according to the embodiment 1, the electric charge of the capacitor for supplying the current to the control terminal of the switching element can be discharged with a simple means safely and so as not to have the influence on another operation.

Embodiment 2

In the embodiment 1, a discharging method of the residual electric charge of the capacitor 111 when the power switch 86 is pressed and the image forming apparatus becomes the OFF state was described. In an embodiment 2, an operation in the case where in the ON state of the image forming apparatus, the electric power supply from the AC power source 100 is cut off due to disconnection of an inlet capable connected to the AC power source 100 or the like will be described. A constitution of the image forming apparatus and a circuit constitution are similar to those in the embodiment 1, and are represented by the same reference numerals or symbols, and will be omitted from description in this embodiment.

[Timing Chart after Stop of Electric Power Supply in Embodiment 2]

Figure 6:
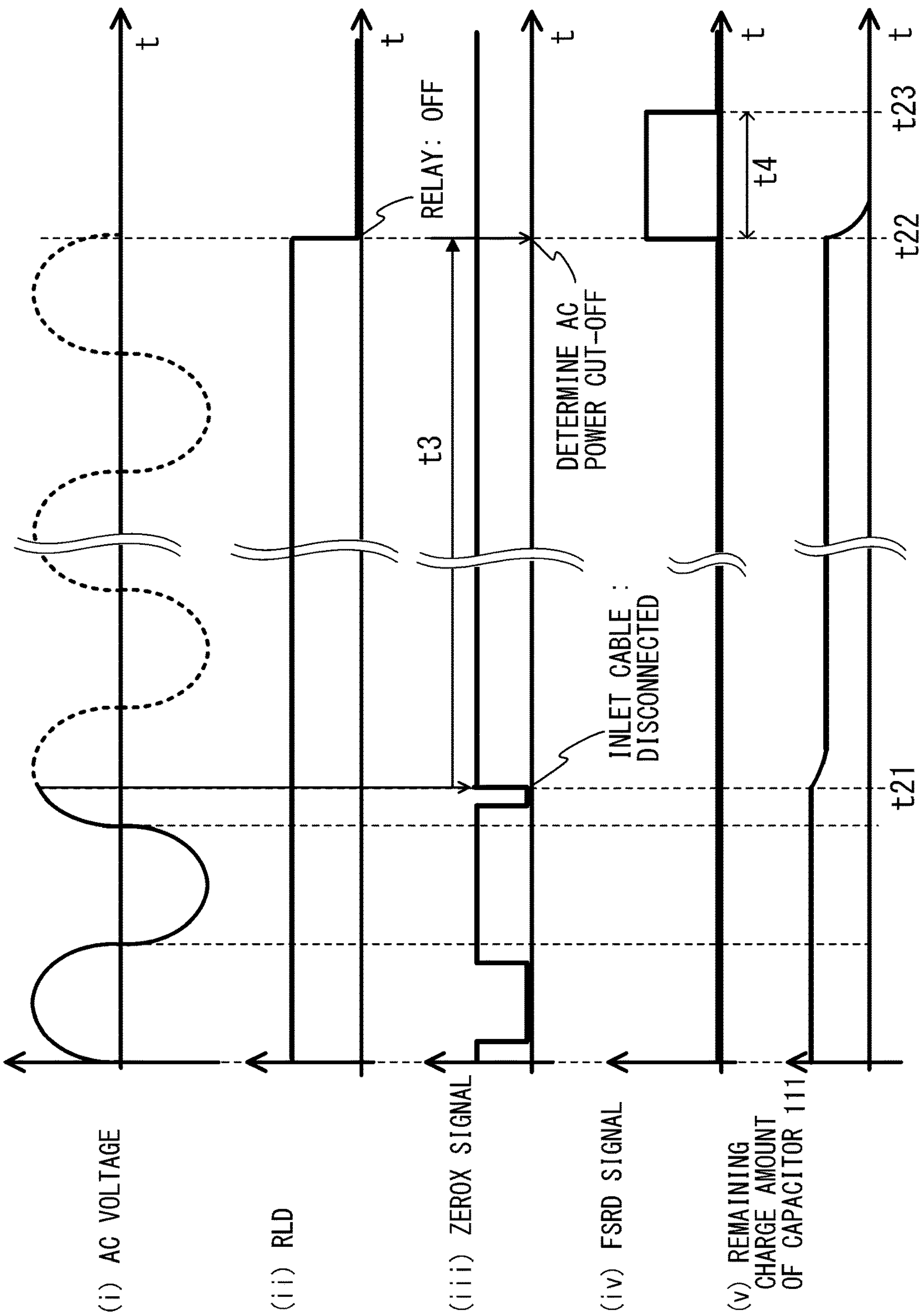
FIG. 6 is a timing chart showing an operation after a stop of electric power supply in an embodiment 2.

FIG. 6 is a timing chart showing an operation when electric power supply is cut off in this embodiment. Incidentally, parts (i) to (v) of FIG. 6 are graphs similar to those of parts (i) to (v) of FIG. 4, respectively, and will be omitted from description.

First, operations of the ZEROX signal and the RLD signal in this embodiment will be described. The ZEROX signal repeats, as described above, operations of the high level and the low level every input of the AC power source 100. When the electric power supply from the AC power source 100 is stopped, the ZEROX signal is kept in the high-level state. A logic of the ZEROX signal is inverted at a timing other than a predetermined cycle and becomes the high-level state, the CPU 94 continuously monitors the logic of the ZEROX signal.

For example, at a timing t21, it is assumed that the electric power supply from the AC power source 100 is stopped due to the disconnection of the inlet cable or the like. In the case where the level of the ZEROX signal is kept at the high level from the timing t21 to a lapse of a time t3(s) which is a third time, the CPU 94 discriminates that the electric power supply from the AC power source 100 is cut off (determination of AC power source cut-off). As regards the ZEROX signal, there is a liability that temporary external noise is superposed on the ZEROX signal. In order to skip (neglect) the external noise, similarly as in the embodiment 1, the ZEROX signal is detected correspondingly to a plurality of unit cycles of the AC power source 100, and then the CPU 94 makes logic determination of the signal. That is, after the state of the ZEROX signal becomes the high-level state, the CPU 94 continuously monitors the ZEROX signal only for a time corresponding to a plurality of cycles of the AC power source 100 determined in advance in order to skip the external noise, and then determines a logic.

After the state of the ZEROX signal became the high-level state, a time necessary to make the logic determination by the CPU 94 is a time t3(s) in the embodiment 2. Here, the time t3(s) corresponds to 2.5 cycles of the AC power source 100 in the embodiment 2. In this embodiment, the AC power source 100 is 50 Hz in frequency, 20 ms in cycle, and 50 ms in time t3(s). The RLD signal is in the high-level state during the operation of the image forming apparatus, and the relay 130 is in the ON state. The CPU 94 discriminates that the electric power supply of the AC power source 100 is cut off after the logic of the ZEROX signal is inverted, in other words, a timing t22 when the high level is maintained and the time t3(s) has elapsed. The CPU 94 changes the RLD signal in state from the high-level state to the low-level state at the timing t22, and brings the relay 130 into the OFF state. Thus, the CPU 94 brings the relay 130 into the OFF state in the case where the level of the ZEROX signal is switched at the timing t21 different from a cycle of the AC voltage and is kept for a third time.

Next, an operation of the FSRD signal will be described. At a start portion of a timing chart, the electric power supply to the heater 54 is not made, and the FSRD signal is not outputted, and therefore, the FSRD signal is in the low-level state. When at the timing t22 after a lapse of the time t3(s) from inversion of the logic of the ZEROX signal, the CPU 94 discriminates that the electric power supply of the AC power source 100 is but off, the CPU 94 changes the FSRD signal in state from the low-level state to the high-level state during a time t4(s). In this embodiment, the time t4(s) is a predetermined time (first time) and is 70 ms, for example. The CPU 94 brings the FSRD signal into the high-level state from the low-level state for the time t4(s), and thereafter, returns the state of the FSRD signal to the low-level state again at a timing t23 and then ends the control.

Finally, a fluctuation in electric charge amount of the capacitor 111 will be described. In an initial state of FIG. 4, the capacitor 111 is in a charged state to a certain degree, and as described above, the capacitor 111 is continuously charged by a half wave of the AC power source 100 on one (polarity) side. After the electric power supply from the AC power source 100 is but off, the electric charge of the capacitor 111 is not charged. Then, the electric charge flows as a current through the resistor 120 and the zero-cross circuit portion 150, and a part of the electric charge is consumed. A remaining electric charge of the capacitor 111 is maintained for a long time. As described above, after the CPU 94 discriminates that the AC power source 100 is cut off, when the FSRD signal is outputted in the high-level state for the time t4(s) from the timing t22 to the timing t23, the gate current Ig of the triac 56 flows. Thus, the gate current Ig of the triac 56 flows, so that the remaining electric charge in the capacitor 111 is largely consumed by the resistors 112 and 114 of the gate portion, and the voltage converges at almost 0 V. At this time, the relay 130 is in the OFF state and the open state, and therefore, the electric power is not supplied to the heater 54, so that the capacitor 111 can be safely discharged without causing unnecessary temperature rise, overheating, or the like.

[Electric Discharge Control Flow Chart in Embodiment 2]

Figure 7:
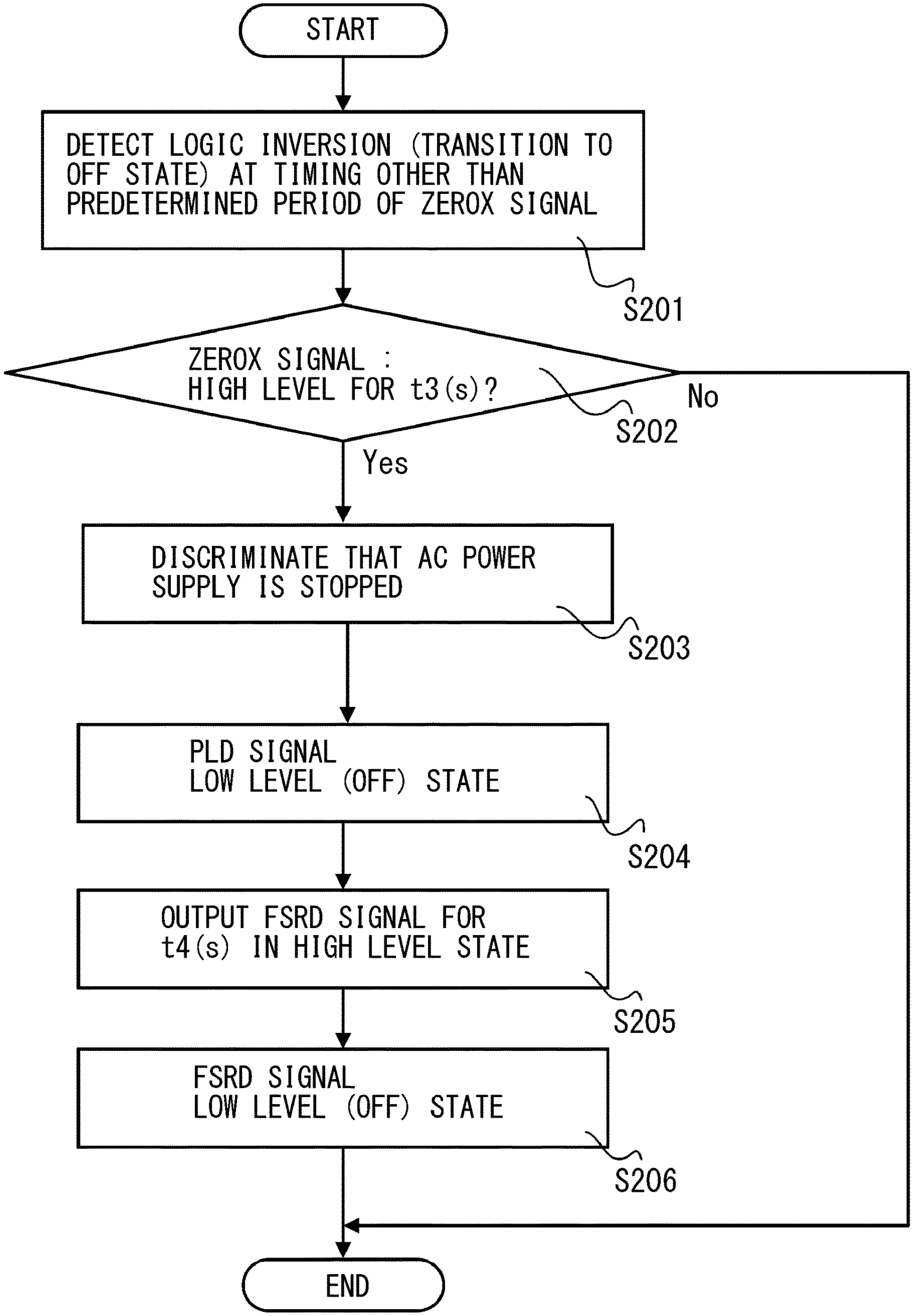
FIG. 7 is a flow chart showing electric discharge control in the embodiment 2.

FIG. 7 is a flow chart showing electric discharge control in the embodiment 2. In S201, after the electric power supply from the AC power source 100 is cut off, the CPU 94 detects that the logic of the ZEROX signal is inverted at a timing other than a predetermined cycle. In S202, the CPU 94 makes reference to at a timer (not shown) and discriminates, during the time t3(s) on the basis of, a timing of S201, whether or not the ZEROX signal is kept at the high level. In the case where the CPU 94 discriminated in S202 that the ZEROX signal is not kept at the high level for the time t3(s), i.e., that the level of the ZEROX signal becomes the low level, the CPU 94 ends the control without performing the electric discharge operation.

In the case where the CPU 94 discriminated in S202 that the ZEROX signal is continuously kept in the high-level state for the time t3(s), the CPU 94 causes the processing to go to S203. In S203, the CPU 94 discriminates that AC electric power supply from the AC power source 100 is stopped. In S204, the CPU 94 changes the RLD signal in state to the low-level state (OFF state). In S205, the CPU 94 outputs the FSRD signal in the high-level state for a time t4(s) on the basis of a timing of S203 while making reference to the timer (not shown). By this, the CPU 94 discharges the residual electric charge of the capacitor 111. In S206, the CPU 94 returns the state of the FSRD signal to the low-level state again and then ends the control.

As described above, in this embodiment, the electric discharge operation in the case where the electric power supply from the AC power source 100 is cut off was described. After the relay 130 is turned off and thus is brought into the open state, the CPU 94 cuts off the electric power supply to the fixing device 50 and then brings the FSRD signal into the ON state, so that the current is caused to flow from the capacitor 111 to the gate portion of the triac 56 and thus the residual electric charge is consumed by being discharged.

Thus, in the case where the electric power supply from the AC power source 100 is cut off, the CPU 94 makes detection depending on the state of the ZEROX signal, and when the CPU 94 discriminates that the electric power supply from the AC power source 100 is cut off, the CPU 94 brings the FSRD signal into the OFF state. The CPU 94 outputs the FSRD signal for a necessary time in the state in which the relay 130 is in the OFF state, and the current is caused to flow through the gate portion of the triac 56, so that the electric charge of the capacitor 111 is consumed. By this, it is possible to discharge the residual electric charge of the capacitor 111 safely in a short time, and therefore, during exchange of a circuit substrate in repair or the like, electric discharge to a peripheral part can be prevented.

As described above, according to the embodiment 2, the electric charge of the capacitor for supplying the current to the control terminal of the switching element can be discharged with a simple means safely and so as not to have the influence on another operation.

Embodiment 3

In an embodiment 3, an operation in the case where the electric discharge operation of the electric charge of the capacitor 111 is stopped during the operation and then the image forming apparatus returns to the print stand-by state will be described. In the case where there is no operation requirement to the image forming apparatus for a predetermined time, in order to realize energy saving, a predetermined signal is outputted from the above-described video controller 91 to the CPU 94. When the predetermined signal is outputted from the video controller 91 to the CPU 94, the CPU 94 stops the electric power supply to a part of the unit by an unshown circuit. In the following, a state in which the electric power supply to the part of the unit is referred to as a sleep state. For example, in the case where the operation requirement to the image forming apparatus is made again through the operation of the PC 90 or the power switch 86 by the user, the CPU 94 operates as follows. That is, the CPU 94 receives, as described above, a signal from the video controller 91 or the power switch 86 (hereinafter, this signal is referred to as a restoration requiring signal), and then resumes the electric power supply to the part of the unit to which the electric power supply is stopped.

In the following, a state in which the electric power supply to the part of the unit is resumed is referred to as a stand-by state. Thus, in this embodiment, the image forming apparatus is operable between the stand-by state which is a first state in which the image formation is carried out and the sleep state which is a second state in which electric power consumption is lower than in the stand-by state which is the first state.

In this embodiment, when the state is changed to the sleep state, the relay 130 is brought into the OFF state and then the electric discharge operation of the capacitor 111 is performed. That is, depending on transition from the stand-by state which is the first state to the sleep state which is the second state, the CPU 94 brings the relay 130 into the OFF state. Further, an operation in which the electric discharge operation is interrupted in the case where the CPU 94 receives the restoration requiring signal to the stand-by state from the power switch 86 or the video controller 91 during the electric discharge operation of the capacitor 111 will be described. A constitution of the image forming apparatus and a circuit constitution are similar to those in the embodiment 1, and are represented by the same reference numerals or symbols, and will be omitted from description in this embodiment.

[Timing Chart of Electric Discharge and Electric Discharge Interruption in Embodiment 3]

Figure 8:
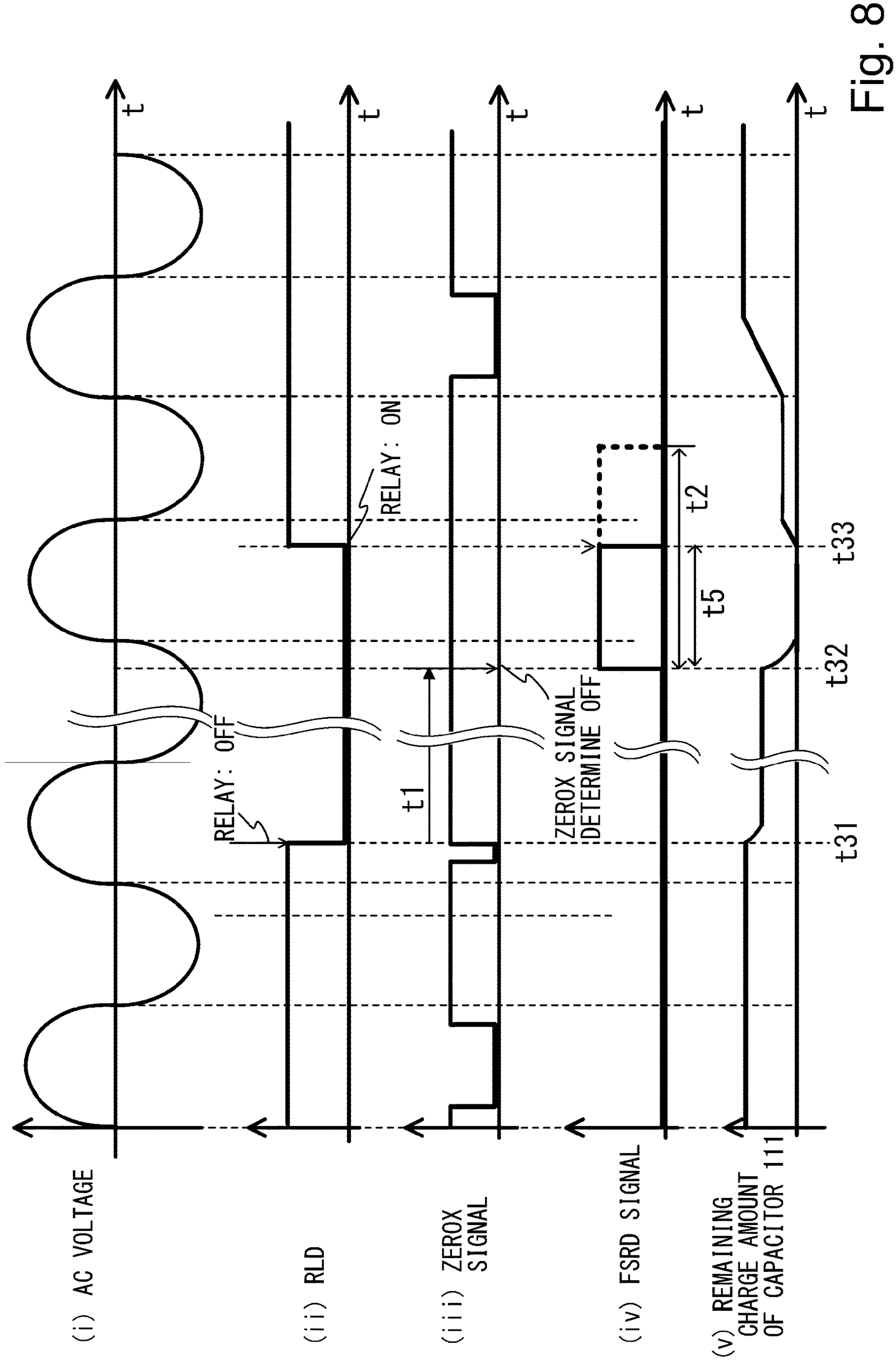
FIG. 8 is a flow showing operations of electric discharge and interruption of the electric discharge in an embodiment 3.

FIG. 8 is a timing chart showing an operation of the electric discharge and the electric discharge interruption in this embodiment. Parts (i) to (v) of FIG. 8 are graphs similar to those of parts (i) to (v) of FIG. 4, respectively. First, operations of the ZEROX signal and the RLD signal will be described. The RLD signal is in the high-level state when the image forming apparatus performs the printing operation or in a print stand-by state, and the relay 130 is in a short-circuited state. When the CPU 94 receives, for example, at a timing t31, a signal of transition of a state thereof to the sleep state from the video controller 91, the CPU 94 changes the level of the RLD signal to the low level and brings the relay 130 into the OFF state (open state).

The level of the ZEROX signal repeats, as described above, the high level and the low level depending on the AC power source 100. When the CPU 94 brings the RLD signal into the low-level state at the timing t31 and thus the relay 130 becomes the OFF state, the ZEROX signal is kept at the high level. Then, similarly as in the embodiment 1, after the RLD signal is changed in level to the low level, the CPU 94 continuously monitors the ZEROX signal for the time t1(s), and then discriminates that the ZEROX signal is kept in the high-level state (OFF state) even at a timing t32 when the time t1(s) has elapsed.

Thereafter, when the CPU 94 receives, as described above, the restoration requiring signal to the stand-by state, for example, at a timing t33, the CPU 94 changes the RLD signal in state from the low-level state to the high-level state again, and thus brings the relay 130 into the ON state. When the state of the RLD signal is changed to the high-level state and thus the state of the relay 130 becomes the ON state, the level of the ZEROX signal repeats the high level and the low level again as described above depending on the AC power source 100.

Next, an operation of the FSRD signal will be described. At a start portion of a timing chart, the electric power supply to the heater 54 is not made, and the FSRD signal is not outputted, and therefore, the FSRD signal is in the low-level state. The CPU 94 receives a transition signal to the sleep state from the video controller 91. The CPU 94 discriminates that the ZERO signal is kept at the high level at a timing t32 when the time t1(s) has elapsed from the timing t31 of the transition of the RLD signal from the high level to the low level. The CPU 94 carries out control so that the FSRD signal is changed in state to the high-level state at the timing t32 and then is kept in the high-level state for the time t2(s) which is the first time.

However, the CPU 94 receives, at a timing t33, the restoration requiring signal to the stand-by state from the power switch 86 or the video controller 91 as described above. For this reason, at a timing t33 when a time t5(s) (<t2(s)) before the lapse of the time t2(s) has elapsed, the CPU 94 changes the level of the FSRD signal to the low level again. A broken-line portion of part (iv) of FIG. 8 shows the time t2(s) in the operation in the embodiment 1, and in the embodiment 3, an operation in which the image forming apparatus is returned to the stand-by state by changing the level of FSRD signal to the low level during the operation without bringing the FSRD signal into the high-level state for the time t2(s). Thus, the CPU 94 not only brings the relay 130 into the ON state depending on the restoration of the image forming apparatus from the sleep state to the stand-by state, but also brings the triac 56 into the non-conduction state.

Finally, a fluctuation in electric charge amount of the capacitor 111 will be described. In an initial state of FIG. 8, the capacitor 111 is in a sufficiently charged state, and as described above, the capacitor 111 is continuously charged every time when the voltage of the AC power source 100 on the L-pole signal is changed to a voltage higher than the voltage on the N-pole signal. The CPU 94 receives, at the timing t31, a signal of transition to the sleep state from the video controller 91, and changes the level of the RLS signal to the low level. Then, the electric charge flows the through the resistor 120 and the zero-cross circuit portion 150, and a part of the electric charge is consumed. Then, by the operation from the timing t32, the CPU 94 changes the FSRD signal in state to the high-level state for a time t5(s). By this, the gate current Ig of the triac 56 flows, so that the remaining electric charge in the capacitor 111 is largely consumed by the resistors 112 and 114 of the gate portion, and the voltage converges at almost 0 V.

After the CPU 94 receives the restoration requiring signal to the stand-by state from the unshown various sensors or the video controller 91 at the timing t33, the CPU 94 changes the RLD signal in state from the low-level state to the high-level state again and thus brings the relay 130 into the ON state. By this, the electric charge is charged from the AC power source 100, so that the residual electric charge in the capacitor 111 is charged and increased every time when the voltage of the AC power source 100 on the L-pole signal is changed to a voltage higher than the voltage on the N-pole side. In the embodiment 3, the resistance value and the voltage value are similar to those in the embodiment 1, and the t5(s) is 50 ms.

[Control Flow Chart of Electric Discharge and Electric Discharge Interruption in Embodiment 3]

Figure 9:
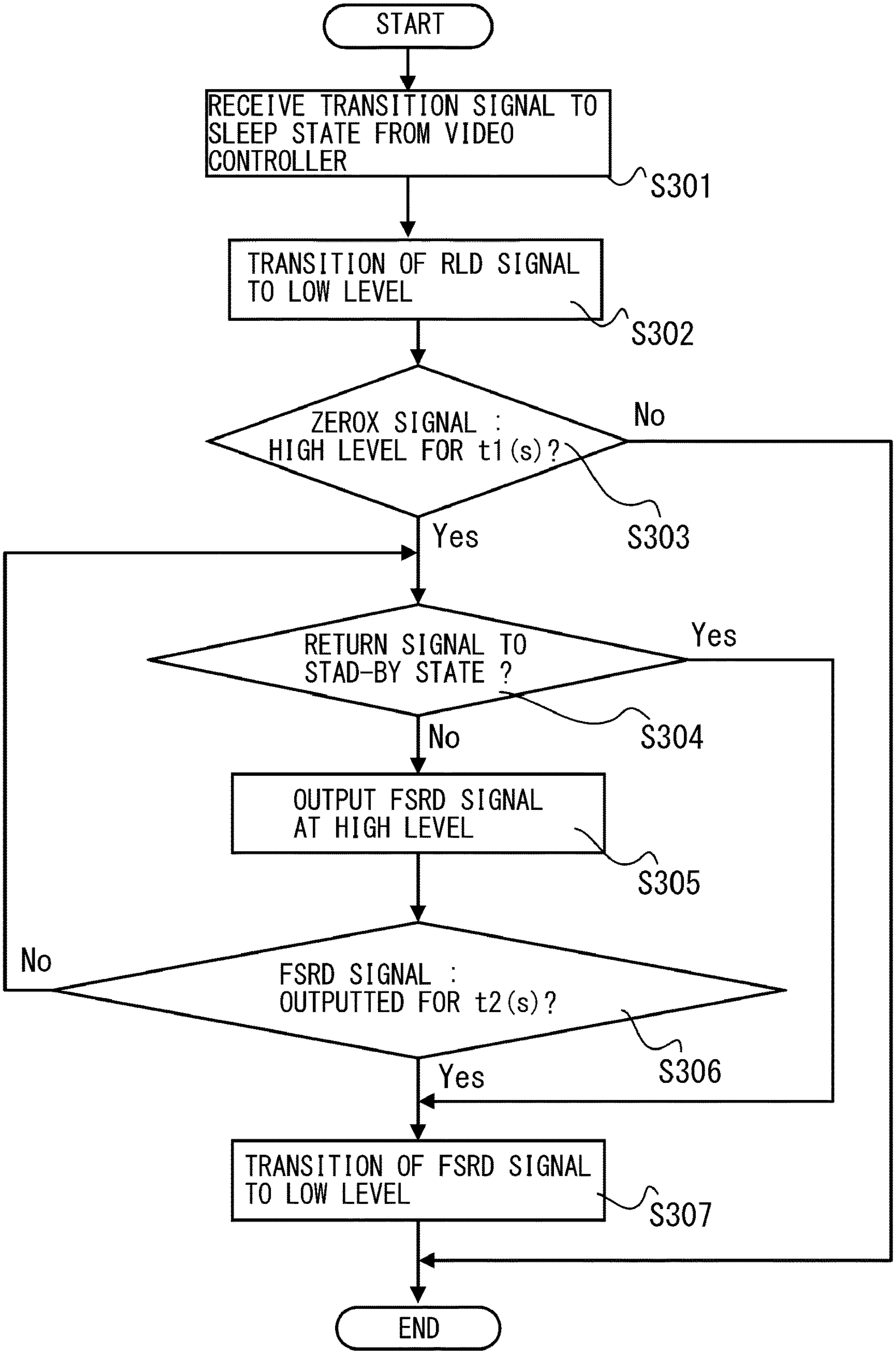
FIG. 9 is a flowchart showing control of the electric discharge of the interruption of the electric discharge in the embodiment 3.

FIG. 9 is a flow chart showing control of electric discharge and electric discharge interruption of the capacitor 111 in the embodiment 3. In S301, the CPU 94 receives a signal of transition to the sleep state from the video controller 91. In S302, the CPU 94 changes the level of the RLD signal to the low level, and brings the relay 130 into the OFF state (open state). In S303, the CPU 94 makes reference to at a timer (not shown) and discriminates, during the time t1(s) on the basis of, a timing of S301, whether or not the ZEROX signal is kept at the high level.

In the case where the CPU 94 discriminated in S303 that the ZEROX signal is not kept at the high level for the time t1(s), i.e., that the level of the ZEROX signal becomes the low level, the CPU 94 ends the control without performing the electric discharge operation. In the case where the CPU 94 discriminated in S303 that the ZEROX signal is kept in the high-level state for the time t1(s), the CPU 94 causes the processing to go to S304.

In S304, the CPU 94 discriminates whether or not the CPU 94 receives, from the power switch 86 or the video controller 91, the restoration requiring signal from the sleep state to the stand-by state. In the case where the CPU 94 discriminated in S304 that the CPU 94 receives the restoration requiring signal to the stand-by state, the CPU 94 causes the processing to go to S307. In the case where the CPU 94 discriminated in S304 that the CPU 94 does not receive the restarting requiring signal to the stand-by state, the CPU 94 causes the processing to go to S305.

In S305, the CPU 94 changes the FSRD signal in state to the high-level state, and outputs the FSRD signal.

In S306, the CPU 94 makes reference to the timer (not shown), and discriminates, on the basis of a timing when the time t1(s) has elapsed, whether or not the time t2(s) has elapsed. In the case where the CPU 94 discriminated in S306 that the time t2(s) has elapsed, the CPU 94 causes the processing to go to S307. In S307, the CPU 94 brings the FSRD signal into the low-level state again, and then ends the control. In the case where the CPU 94 discriminated in S306 that the time t2(s) has not elapsed, the CPU 94 returns the processing to S304.

That is, in S304, the CPU 94 discriminates again in whether or not the CPU 94 receives the restoration requiring signal to the stand-by state, and then repeats a similar operation.

As described above, in the embodiment 3, the operation in which when the image forming apparatus receives the returning signal from the sleep state to the stand-by state during the electric discharge operation of the capacitor 111 by the CPU 94 in the sleep state, the electric discharge is stopped during operation was described. Also, in this embodiment, after the relay 130 is turned off and thus is brought into the open state, the CPU 94 brings the FSRD signal into the ON state, so that the current is caused to flow from the capacitor 111 to the gate portion of the triac 56 and thus the residual electric charge is discharged and consumed. By this, the electric charge of the capacitor 111 can be discharged while preventing thermal destruction to the fixing device 50 by temperature rise or the like of the heater 54. Further, even when the print requirement is made during the electric discharge of the capacitor 111, the electric discharge operation is stopped during the processing and then the operation returns to the print operation again, so that it is possible to prevent the influence on an operation immediately after the electric discharge operation. By doing so, it is possible to discharge the residual electric charge of the capacitor 111 safely in a short time without having the influence on another operation, and therefore, during exchange of a circuit substrate in repair or the like, electric discharge to a peripheral part can be prevented.

As described above, according to the embodiment 3, the electric charge of the capacitor for supplying the current to the control terminal of the switching element can be discharged with a simple means safely and so as not to have the influence on another operation.

Embodiment 4

In an embodiment 4, an operation in the case where electric discharge of the electric charge of the capacitor 111 is completed in a short time will be described. In the embodiments 1 to 3, after the CPU 94 detects that the zero-cross signal is not inputted, in other words, that the zero-cross signal is kept at the high level, the FSRD signal is outputted, so that the electric charge of the capacitor 111 is discharged. In this embodiment, after the relay 130 is brought into the open (OFF state), the FSRD signal is outputted without detecting the zero-cross signal and determining a state of the zero-cross signal, so that the electric charge of the capacitor 111 is discharged. By doing so, electric discharge of the residual electric charge can be completed in a shorter time. In the case where detection and state monitoring of the zero-cross signal are not made, when the relay 130 is in failure and the FSRD signal is outputted always in a short-circuited state, the electric power is supplied to the heater 54, so that a temperature of the heater 54 of the fixing device 50 is increased. When the temperature is increased in the fixing device 50, there is a liability that a component part is thermally broken.

Therefore, in this embodiment, not only the electric discharge operation of the electric charge of the capacitor 111 as described above is performed, but also the CPU 94 causes a thermistor which is the fixing temperature sensor 59 to monitor the temperature of the heater 54. In this embodiment, a constitution in which in the case where the temperature of the heater 54 becomes a predetermined temperature or more from a detection result of the fixing temperature sensor 59, the CPU 94 stops an operation, as failure of the relay 130, for safety will be described. In this embodiment, a constitution of the image forming apparatus, a circuit constitution resistance values, and voltage values are similar to those in the embodiment 1, and are represented by the same reference numerals or symbols, and will be omitted from description.

[Timing Chart of Electric Discharge Operation in Embodiment 4]

Figure 10:
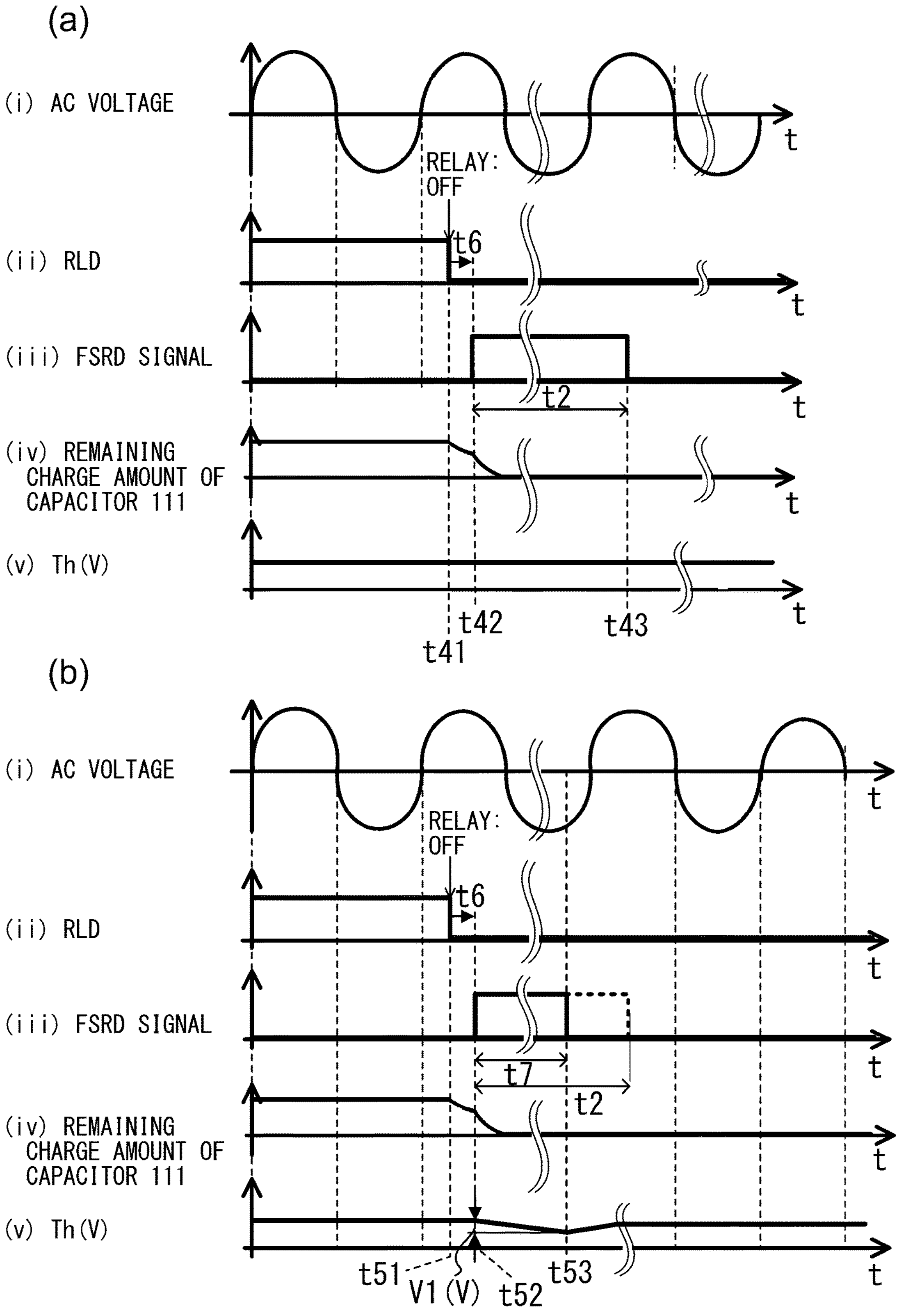
FIG. 10 is a timing chart showing operation of a relay during a normal operation and during failure in an embodiment 4.

Parts (a) and (b) of FIG. 10 are timing charts showing operations in this embodiment. Part (a) of FIG. 10 shows the operation in the case where the relay 130 normally operates without failure, and part (b) of FIG. 10 shows the operation in the case where the relay 130 is in failure and is always in a short-circuited state. Incidentally, (i) and (ii) of each of parts (a) and (b) of FIG. 10 are graphs similar to (i) and (ii) of FIG. 4, respectively, and (iii) and (iv) of each of parts (a) and (b) of FIG. 10 are graphs similar to (iii) and (iv) of FIG. 4, respectively. Further, (v) of each of parts (a) and (b) of FIG. 10 shows a waveform of a signal Th(V) which is a detection result of the fixing temperature sensor 59.

First, an operation of the RLD signal in this embodiment will be described. The operation of the RLD signal is the same between parts (a) and (b) of FIG. 10. That is, similarly as in the embodiment 3, when the CPU 94 receives a signal for bringing the image forming apparatus into the sleep state, the CPU 94 changes the level of the RLD signal to the low level at timings t41 and t51, and brings the relay 130 into the OFF state (open state).

Next, the FSRD signal will be described. In both of parts (a) and (b) of FIG. 10, at timings t42 and t52 after a lapse of a time t6(s) from the timings t41 and t51, respectively, when the level of the RLD signal is changed to the low level, the CPU 94 brings the FSRD signal into the high-level state and then outputs the FSRD signal. The time t6(s) is a time required until a bounce operation of the contact of the relay 130 is stabilized when the contact of the relay 130 changes in state from the short-circuited state to the open state. In this embodiment (embodiment 4), the time t6(s) is 20 ms, for example.

(FSRD Signal: When Relay Normally Operates)

In parts (a) of FIG. 10 in which the relay 130 normally operates, at the timing t42 after the lapse of the time t6(s) from output of the RLD signal at the timing t41, the CPU 94 outputs the FSRD signal in the high-level state for the time t2(s). Thereafter, the CPU 94 changes the level of the FSRD signal to the low level at a timing t43 when the time t2(s) has elapsed. In this embodiment, the time t2(s) is similar to the time t2(s) in the embodiment 1, and the time t2 is 100 ms.

(FSRD Signal: When Relay is in Failure)

In part (b) of FIG. 10 in which the relay 130 is in failure, at the timing t52 after the lapse of the time t6(s) from the output of the low level-RLD signal at the timing t51, the CPU 94 outputs the FSRD signal in the high-level state for a time t7(s). The CPU 94 changes the level of the FSRD signal to the low level at a timing t53 after a lapse of the time t7(s) shorter than the time t2(s). The time t7(s) is a time until a timing when the temperature of the heater 54 which is a detection result of the FTS59 (thermistor) described later reaches a predetermined temperature, and in this embodiment, the time t7(s) is 70 ms.

Next, an operation of a residual electric charge of the capacitor 111 will be described. This operation is the same between parts (a) and (b) of FIG. 10. In an initial state of FIG. 10, the state is a charged state to a certain degree, and as described above, the electric charge is continuously charged by a half wave of the AC power source 100 on one side. After the CPU 94 changes the level of the RLD signal to the low level at the timings t41 and t51, a current flows through the resistor 120 and the zero-cross circuit portion 150, and a part of the electric charge of the capacitor 111 is consumed. A residual electric charge of the capacitor 111 is continuously maintained, and when the CPU 94 outputs the HL-FSRD signal at the timings t42 and t52, the gate current Ig of the triac 56 flows, so that the residual electric charge of the capacitor 111 is largely consumed by the resistors 112 and 114. By this, the electric charge of the capacitor 111 is drastically decreased and converges to almost 0 V.

Finally, an operation of a Th signal which is a detection result of the thermistor which is the fixing temperature sensor 59. As described above, the Th signal is a signal obtained by dividing the DC voltage Vcc1 by the resistor 121 and the fixing temperature sensor 59. The Th signal shows a voltage value outputted depending on a change in resistance value of the fixing temperature sensor 59 by a change of the heater 54. The Th signal shows a high-voltage value at a low temperature and a low-voltage value at a high temperature. In the initial stage of both of parts (a) and (b), the voltage at, for example, about 30° C. which is a room temperature is shown.

(Th Signal: When Relay Normally Operates)

In part (a) of FIG. 10, the relay 130 normally operates, and when the CPU 94 changes the level of the RLD signal to the low level at the timing t41, the state of the contact becomes the open state. That is, even when the CPU 94 outputs the FSRD signal, the electric power is not supplied to the heater 54, and therefore, there is no change in Th signal even after the timing t42. Thus, also in the embodiment 4, when the CPU 94 changes the relay 130 in state from the ON state to the OFF state, the CPU 94 brings the triac 56 into the conduction state for a predetermined time (time t2) after the CPU 94 changes the state of the relay 130 to the OFF state, so that the electric charge of the capacitor 111 is discharged.

(Th Signal: Relay is in Failure)

On the other hand, in part (b) of FIG. 10, the relay 130 is in failure while being kept in the short-circuited state. Then, in part (b) of FIG. 10, even when the CPU 94 changes the level of the RLD signal to the low level at the timing t51, the contact of the relay 130 is kept short-circuited. In this state, when the CPU 94 outputs the high level-FSRD signal at the timing t52, the electric power is supplied to the heater 54, so that a thermistor temperature of the fixing temperature sensor 59 increases. When the thermistor temperature of the fixing temperature sensor 59 increases, a voltage of the Th signal lowers. Then, at the timing t53 when the Th signal is changed from the timing t52 of the output of the high level-FSRD signal by a voltage V1(V) corresponding to a temperature determined in advance, the CPU 94 discriminates that the relay 130 is in failure. By this, the CPU 94 not only causes a display portion (not shown) or the like provided on the image forming apparatus to notify the user (operator) of circuit failure, but also returns the state of the FSRD signal from the high-level state to the low-level state at the timing t53.

Thus, the CPU 94 brings the triac 56 into the non-conduction state in the case where in a period in which the triac 56 is brought into the conduction state in order to discharge the electric charge of the capacitor 111, a change in temperature of the heater 54 becomes a predetermined temperature or more on the basis of a detection result of the fixing temperature sensor 59, the triac 56 is brought into the non-conduction state. Incidentally, the predetermined temperature is X1 (° C.) described later. Then, the CPU 94 discriminates that the relay 130 was in failure.

When the state of the FSRD signal is returned from the high-level state to the low-level state, the electric power supply to the heater 54 is stopped, so that the thermistor temperature of the fixing temperature sensor 59 lowers. When the thermistor temperature of the fixing temperature sensor 59 lowers, the voltage of the Th signal increases and then returns to a voltage value corresponding to about room temperature. In this embodiment, the voltage value of the Th signal corresponding to about room temperature is 3.2 V and corresponds to 35° C. A voltage V1 which is a threshold for switching the level of the FSRD signal to the low level by the CPU 94 is 2.8 V corresponding to 75° C. Other resistance values and voltage values are similar to those in the embodiment 1. Before the thermistor temperature becomes a higher temperature, by stopping the output of the FSRD signal when the output exceeds a predetermined threshold, thermal breakage of the fixing device 50 due to overheating can be prevented. Incidentally, in the above-described description, the constitution of the embodiment 4 was applied to the embodiment 3, but may also be applied to the embodiment 1 or the embodiment 2.

[Electric Discharge Control Flow Chart in Embodiment 4]

Figure 11:
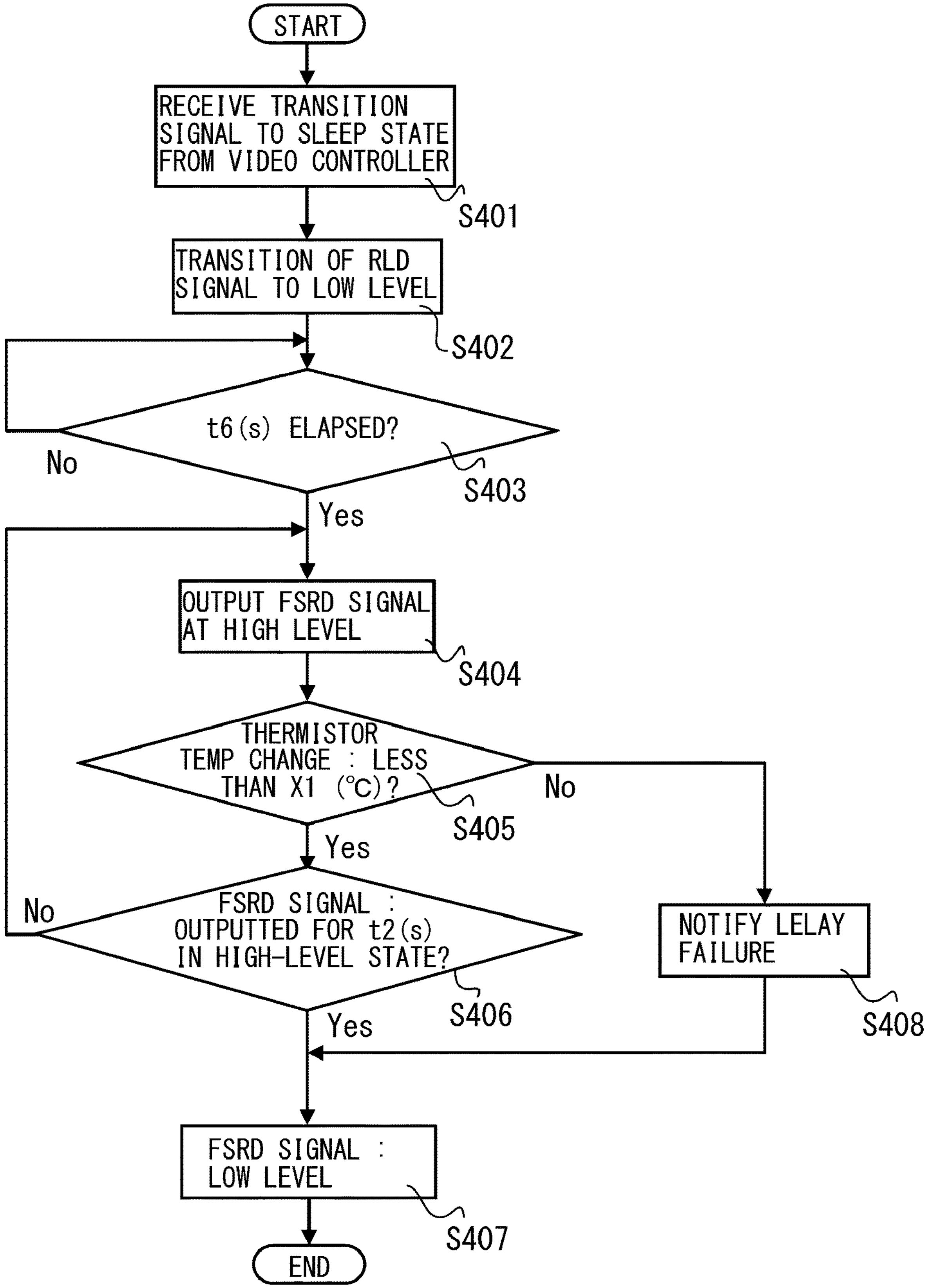
FIG. 11 is a flow chart showing electric discharge control in the embodiment 4.

FIG. 11 is a flow chart showing electric discharge control of the capacitor 111 in the embodiment 4. In S401, the CPU 94 receives, as described above, a signal of transition to the sleep state, from the video controller 91. In S402, the CPU 94 changes the level of the RLD signal to the low level.

In S403, the CPU 94 makes reference to the timer (not shown), and discriminates whether or not the time t6(s) has elapsed on the basis of a timing of S402. In the case where the CPU 94 discriminated in S403 that the time t6(s) has not elapsed, the CPU 94 returns the processing to S403, and in the case where the CPU 94 discriminated in S403 that the time t6(s) has elapsed, the CPU 94 causes the processing to go to S404. In S404, the CPU 94 outputs the FSRD signal in the high-level state. At this time, the CPU 94 causes a writable storing portion, for example, the memory 95 to store a detection result of the fixing temperature sensor 59.

In S405, on the basis of the detection result of the thermistor which is the fixing temperature sensor 59, the CPU 94 discriminates whether or not a temperature increasing value is less than X1 (° C.) compared with a temperature increasing value when the output of the FSRD signal is started at the high level. Incidentally, the CPU 94 reads a detection result of the fixing temperature sensor 59 at a point of the time of S404 stored in the memory 95, and compares the detection result with a detection result of the fixing temperature sensor 59 at a point of the time of S405, so that the CPU 94 acquires a temperature increasing value. Further, in this embodiment, X1 is 40° C., for example.

In S405, in the case where the CPU 94 discriminated that the temperature change of the thermistor is X1 (° C.) or more, the CPU 94 causes the processing to go to S408. In S408, the CPU 94 notifies the user of failure of the relay 130 via the display portion (not shown), and causes the processing to go to S407. In S407, the CPU 94 brings the FSRD signal into the low-level state, and then ends the control.

In S405, in the case where the CPU 94 discriminated that the temperature change of the thermistor is less than X1 (° C.), the CPU 94 causes the processing to go to S406. In S406, the CPU 94 makes reference to the timer (not shown) and discriminates whether or not the time t2(s) has elapsed from the timing when the CPU 94 brings the FSRD signal into the high-level state. In the case where the CPU 94 discriminated in S406 that the time t2(s) has elapsed, the CPU 94 causes the processing to go to S407. In the case where the CPU 94 discriminated in S406 that the time t2(s) has not elapsed, the CPU 94 returns the processing to S404 and continues the output of the FSRD signal in the high-level state.

As described above, in the embodiment 4, in the case where the relay 130 is short-circuited and is in failure, the CPU 94 monitors the temperature of the fixing temperature sensor 59 during the electric discharge operation while discharging the electric charge of the capacitor 111. By this, the CPU 94 detects a short-circuit failure of the relay 130. Such a constitution was described. By employing such a constitution, the short circuit failure of the relay 130 can also be detected without discriminating the detection and the state of the FSRD signal, so that it is possible to discharge the residual electric charge of the capacitor 111 safety in a short time without having the influence on another operation. For this reason, when the circuit substrate is exchanged due to the repair or the like, the electric discharge to the peripheral parts can be prevented. Further, the failure of the relay 130 can be detected during the electric discharge operation, and therefore, even in the case where the relay 130 caused the short-circuit failure, thermal breakage of the fixing device 50 and the image forming apparatus due to the overheating can be prevented.

As described above, according to the embodiment 4, the electric charge of the capacitor for supplying the current to the control terminal of the switching element can be discharged with a simple means safely and so as not to have the influence on another operation.

The above-described embodiments at least disclose the following heating devices and the image forming apparatuses.

(Item 1)

A heating device for heating an image formed on a recording material, comprising:

a heat generating element configured to generate heat by electric power supplied from an AC power source;

a switching element configured to supply the electric power from the AC power source to the heat generating element in a conduction state and to cut off the supply of the electric power in a non-conduction state;

a capacitor configured to supply a current to a control terminal of the switching element;

connecting means configured to be connected between the AC power source and the switching element so as to supply the electric power to the switching element in an on state and so as to cut off the supply the electric power to the switching element in an off state; and a controller configured to control the connecting means and to control the switching element by controlling the supply of the current from the capacitor to the control terminal, wherein when the connecting means is changed in state from the on state to the off state, the controller causes the capacitor to discharge an electric charge of the capacitor by bringing the switching element into the conduction state for a predetermined time after the connecting means is changed in state to the off state.

(Item 2)

A heating device according to the item 1, further comprising a zero-cross detecting means connected to the AC power source via the connecting means and configured to output a high-level state or a low-level state depending on a cycle of an AC voltage of the AC power source, wherein when the predetermined time is a first time, the controller brings the switching element into the conduction state in a case that a level of the high-level state or the low-level state is maintained for a second time after the connecting means is changed in state to the off state.

(Item 3)

A heating device according to the item 2, wherein the controller controls the connecting means so as to be changed in state to the off state in a case that the level of the high-level state or the low-level state is maintained for a third time after being switched at a timing different from the cycle of the AC voltage.

(Item 4)

A heating device according to any one of the items 1 to 3, further comprising a temperature detecting means configured to detect a temperature of the heat generating element, wherein in a period in which the switching element is brought into the conduction state in order to discharge the electric charge of the capacitor, in a case that a change in temperature of the heat generating element is a predetermined temperature or more on the basis of a detection result of the temperature detecting means, the controller brings the switching element into the conduction state.

(Item 5)

A heating device according to any one of the items 1 to 4, wherein in a period in which the switching element is brought into the conduction state in order to discharge the electric charge of the capacitor, in a case that a change in temperature of the heat generating element is the predetermined temperature or more on the basis of a detection result of the temperature detecting means, the controller discriminates that the connecting means is in failure.

(Item 6)

A heating device according to any one of the items 1 to 5, wherein the connecting means is a relay.

(Item 7)

An image forming apparatus comprising:

image forming means configured to form an image on a recording material; and a heating device according to any one of the items 1 to 5 and configured to fix a toner image formed by the image forming means.

(Item 8)

An image forming apparatus comprising:

image forming means configured to form an image on a recording material;

a heating device according to the items 1 or 2 and configured to fix a toner image formed by the image forming means; and a power switch configured to cut off a power source, wherein the controller controls the connecting means so as to be changed in state to the off state depending on that the power switch is turned off.

(Item 9)

An image forming apparatus operable in a first state in which an image is formed and a second state lower in electric power consumption than in the first state, the image forming apparatus comprising:

image forming means configured to form an image on a recording material; and a heating device according to the item 1 and configured to fix a toner image formed by the image forming means, wherein depending on transition from the first state to the second state, the controller controls the connecting means so as to be changed in state to the off state.

(Item 10)

An image forming apparatus according to the item 9, wherein depending on a return from the second state to the first state, the controller controls the connecting means so as to be changed in state to the on state and brings the switching element into the non-conduction state.

(Item 11)

An image forming apparatus according to any one of the items 7 to 10, further comprising a temperature detecting means configured to detect a temperature of the heat generating element, wherein in a period in which the switching element is brought into the conduction state in order to discharge the electric charge of the capacitor, in a case that a change in temperature of the heat generating element is a predetermined temperature or more on the basis of a detection result of the temperature detecting means, the controller brings the switching element into the conduction state.

As described above, according to the present invention, the electric charge of the capacitor for supplying the current to the control terminal of the switching element can be discharged with a simple means safely and so as not to have the influence on another operation.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-195210 filed on Dec. 6, 2022, which is hereby incorporated by reference herein in its entirety.

What is claimed is:

1. A heating device for heating an image formed on a recording material, comprising:

a heat generating element configured to generate heat by electric power supplied from an AC power source;

a switching element configured to supply the electric power from the AC power source to the heat generating element in a conduction state and to cut off supply of the electric power in a non-conduction state;

a capacitor configured to supply a current to a control terminal of the switching element;

connecting means configured to be connected between the AC power source and the switching element so as to supply the electric power to the switching element in an on state and so as to cut off supply of the electric power to the switching element in an off state; and a controller configured to control the connecting means and to control the switching element by controlling supply of the current from the capacitor to the control terminal, wherein when the connecting means is changed in state from the on state to the off state, the controller causes the capacitor to discharge an electric charge of the capacitor by bringing the switching element into the conduction state for a predetermined time after the connecting means is changed in state to the off state.

2. A heating device according to claim 1, further comprising zero-cross detecting means connected to the AC power source via the connecting means and configured to output a high-level signal or a low-level signal depending on a cycle of an AC voltage of the AC power source, wherein when the predetermined time is a first time, the controller brings the switching element into the conduction state in a case that a level of the signal is maintained for a second time after the connecting means is changed in state to the off state.

3. A heating device according to claim 2, wherein the controller controls the connecting means so as to be changed in state to the off state in a case that the level of the signal is switched at a timing different from the cycle of the AC voltage and then is maintained for a third time.

4. A heating device according to claim 1, further comprising temperature detecting means configured to detect a temperature of the heat generating element, wherein in a period in which the switching element is brought into the conduction state in order to discharge the electric charge of the capacitor, in a case that a change in temperature of the heat generating element is a predetermined temperature or more on the basis of a detection result of the temperature detecting means, the controller brings the switching element into the non-conduction state.

5. A heating device according to claim 4, wherein in a period in which the switching element is brought into the conduction state in order to discharge the electric charge of the capacitor, in a case that a change in temperature of the heat generating element is the predetermined temperature or more on the basis of a detection result of the temperature detecting means, the controller discriminates that the connecting means is in failure.

6. A heating device according to claim 1, wherein the connecting means is a relay.

7. An image forming apparatus comprising:

image forming means configured to form an image on a recording material; and a heating device according to claim 1 and configured to fix a toner image formed by the image forming means.

8. An image forming apparatus comprising:

image forming means configured to form an image on a recording material;

a heating device according to claim 1 and configured to fix a toner image formed by the image forming means; and a power switch configured to cut off a power source, wherein the controller controls the connecting means so as to be changed in state to the off state depending on that the power switch is turned off.

9. An image forming apparatus operable in a first state in which an image is formed and a second state lower in electric power consumption than in the first state, the image forming apparatus comprising:

image forming means configured to form an image on a recording material; and a heating device according to claim 1 and configured to fix a toner image formed by the image forming means, wherein depending on transition from the first state to the second state, the controller controls the connecting means so as to be changed in state to the off state.

10. An image forming apparatus according to claim 9, wherein depending on a return from the second state to the first state, the controller controls the connecting means so as to be changed in state to the on state and brings the switching element into the non-conduction state.

11. An image forming apparatus according to claim 9, further comprising temperature detecting means configured to detect a temperature of the heat generating element, wherein in a period in which the switching element is brought into the conduction state in order to discharge the electric charge of the capacitor, in a case that a change in temperature of the heat generating element is a predetermined temperature or more on the basis of a detection result of the temperature detecting means, the controller brings the switching element into the non-conduction state.

* * * * *